Jan. 22, 1963     L. S. WILLIAMS     3,074,496
WEIGHING SCALE
Filed Dec. 30, 1957     14 Sheets-Sheet 1
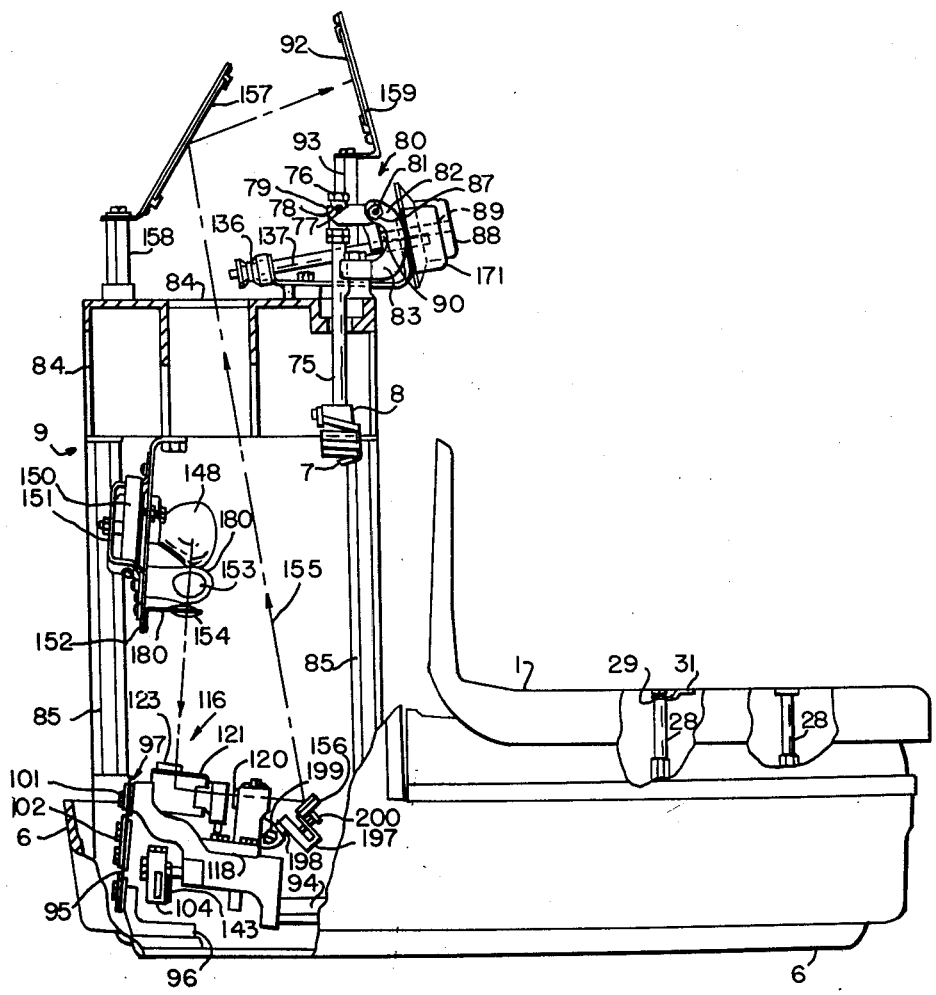
_Fig. I_
INVENTOR.
LAWRENCE S. WILLIAMS
BY
ATTORNEYS Jan. 22, 1963   L. S. WILLIAMS   3,074,496
WEIGHING SCALE
Filed Dec. 30, 1957   14 Sheets-Sheet 2
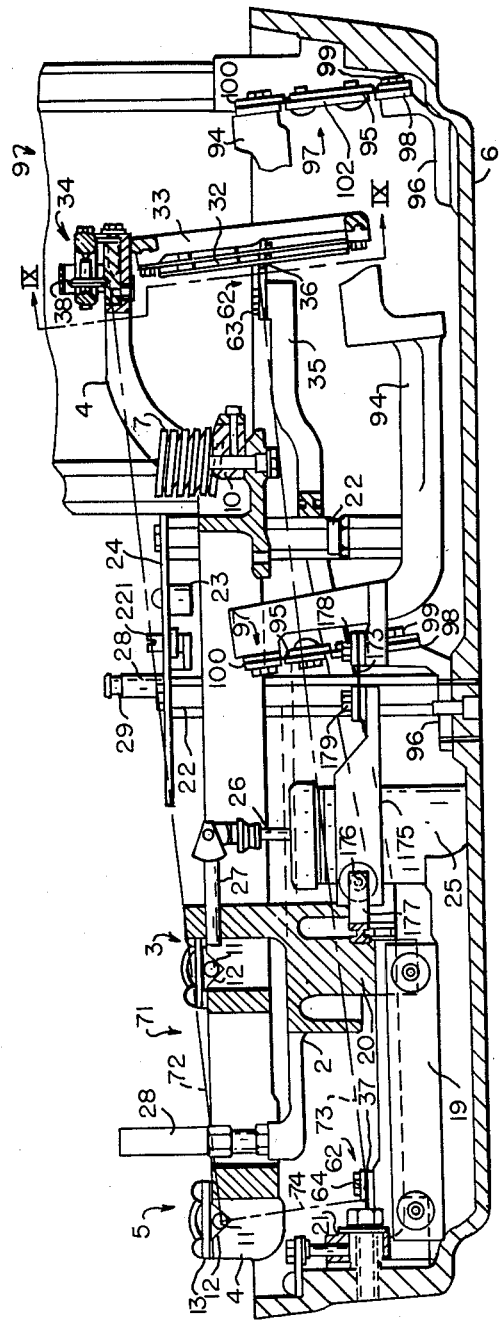
Fig. II
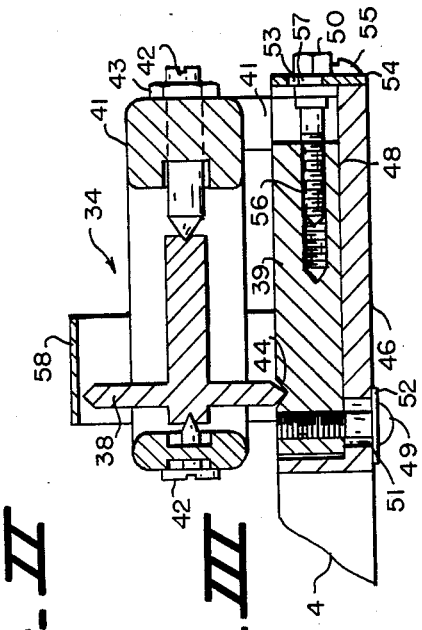
Fig. III
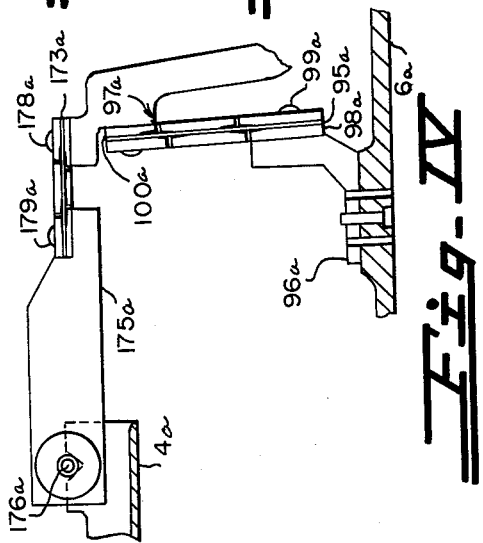
Fig. IV
INVENTOR.
LAWRENCE S. WILLIAMS
BY
*Marshall, Marshall & Yeasting*
ATTORNEYS

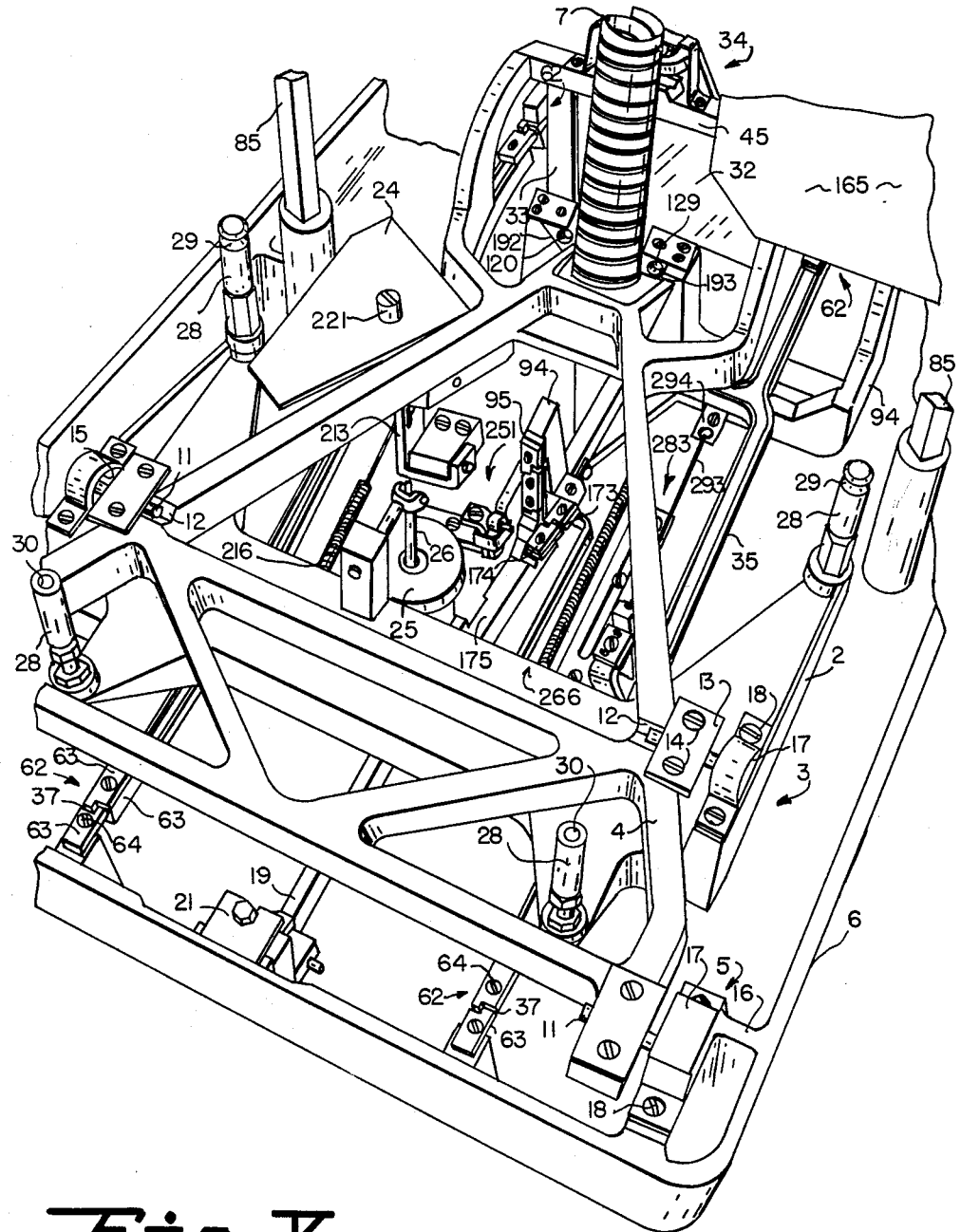
Fig. V
INVENTOR.
LAWRENCE S. WILLIAMS
BY
Marshall, Marshall & Yeasting
ATTORNEYS

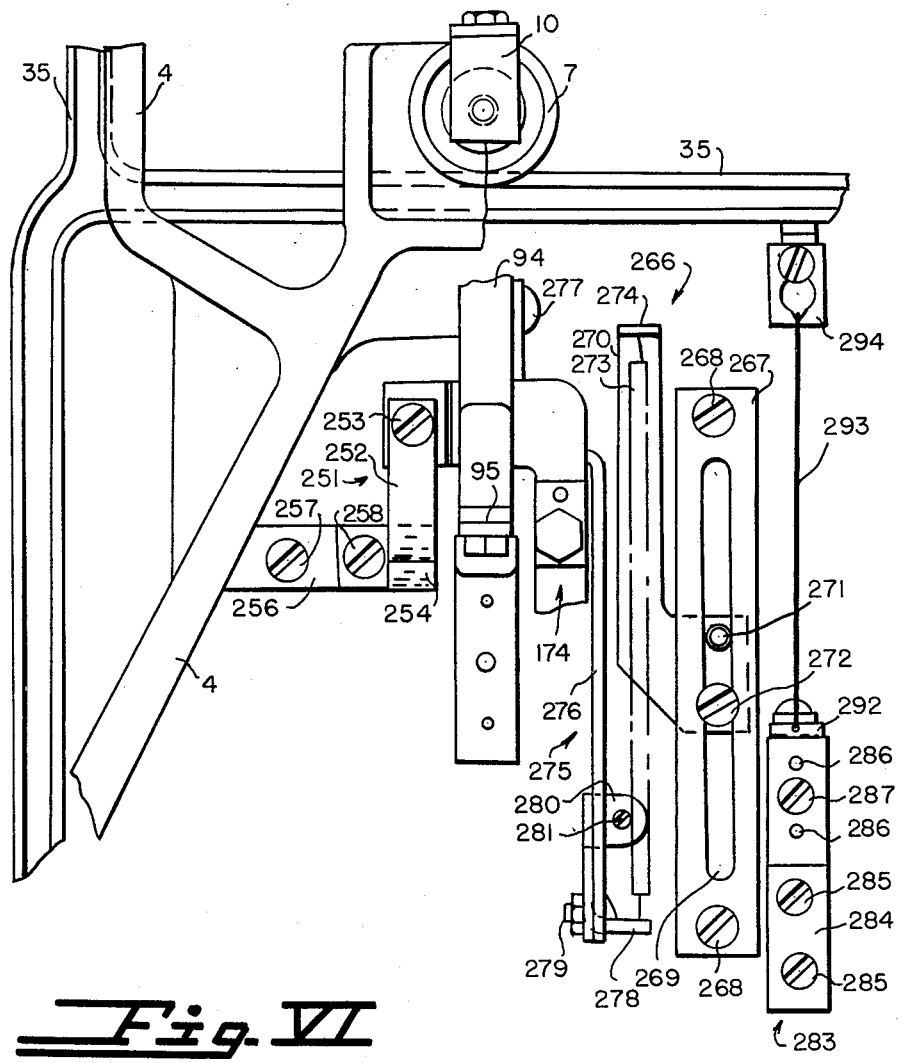

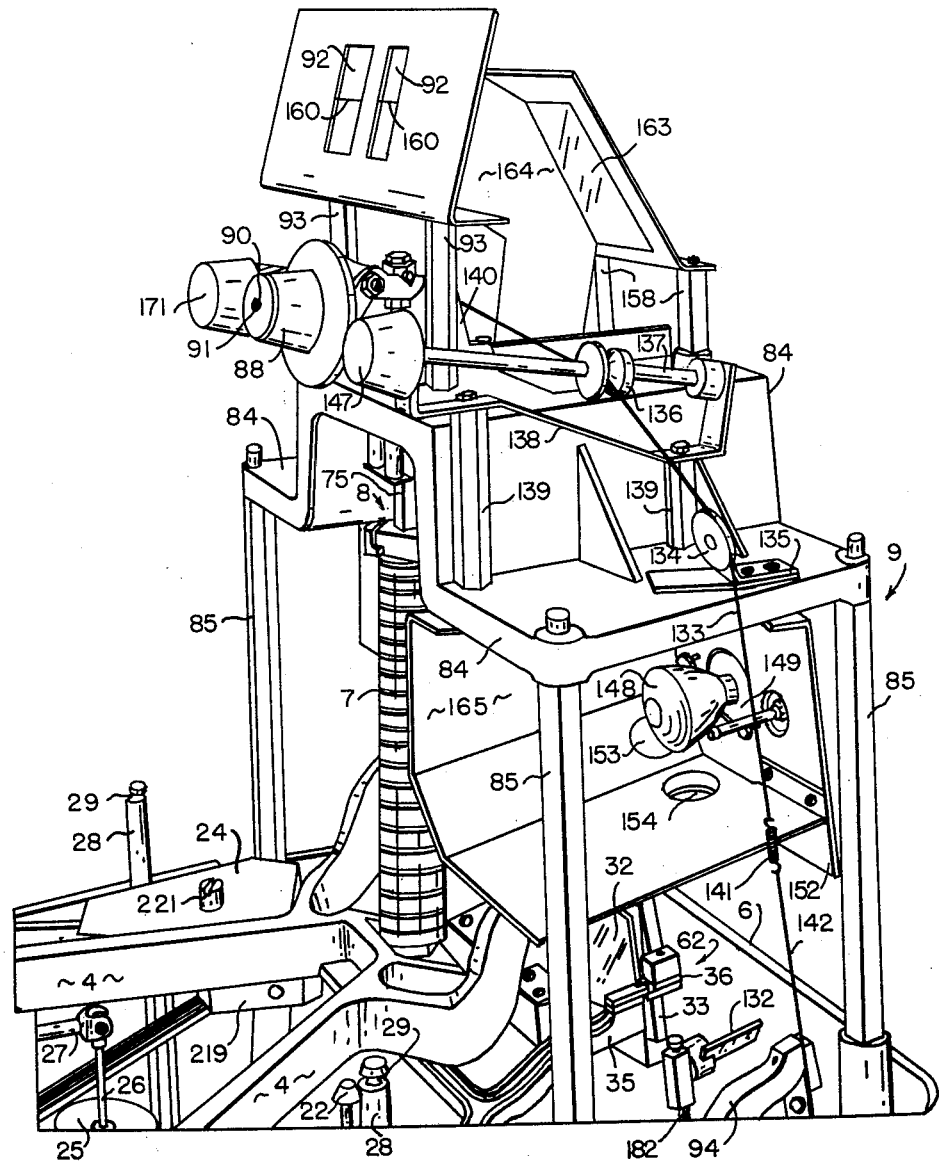
Fig. VII
INVENTOR.
LAWRENCE S. WILLIAMS

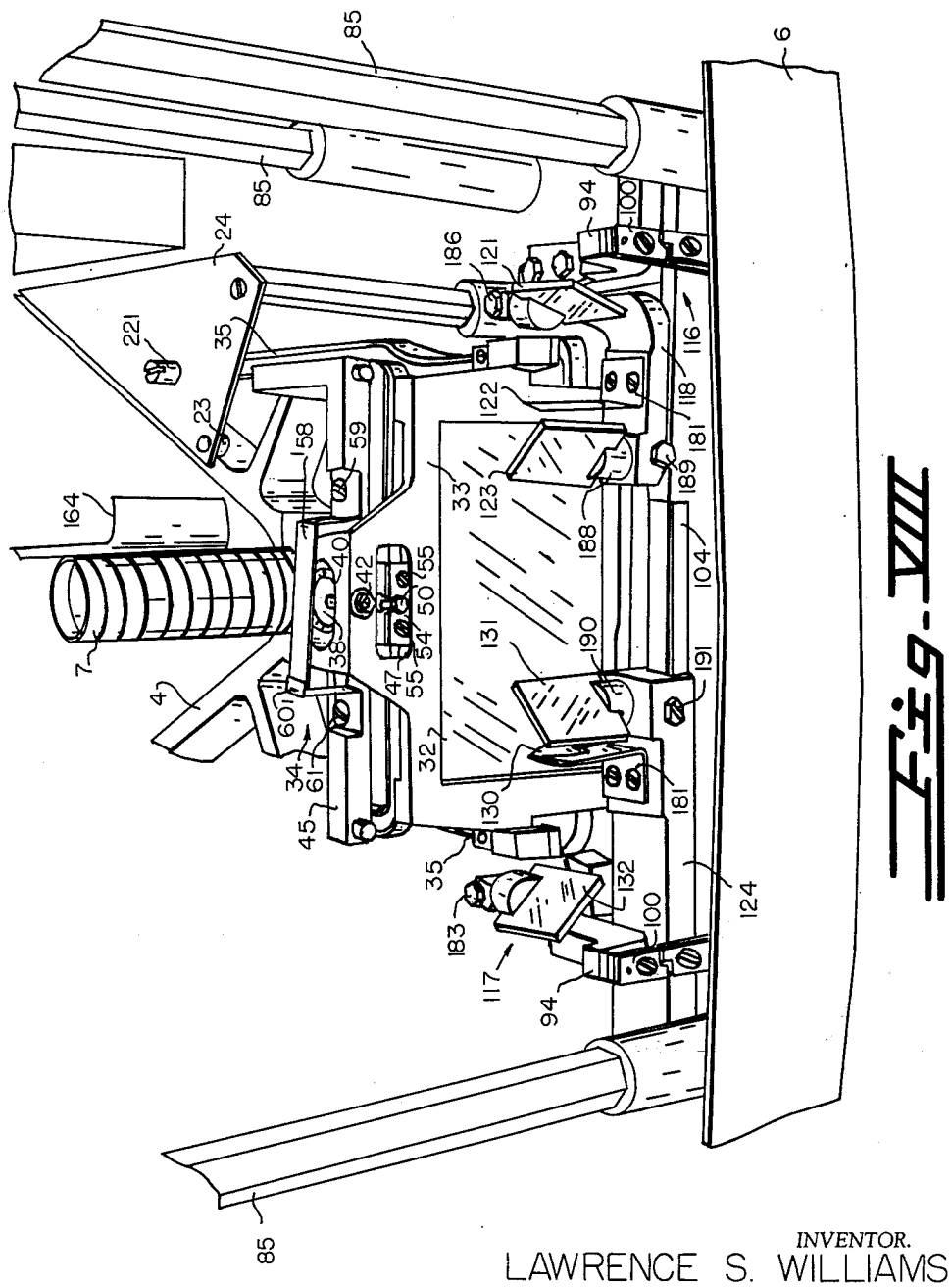

Jan. 22, 1963 — L. S. WILLIAMS — 3,074,496
WEIGHING SCALE
Filed Dec. 30, 1957 — 14 Sheets-Sheet 7
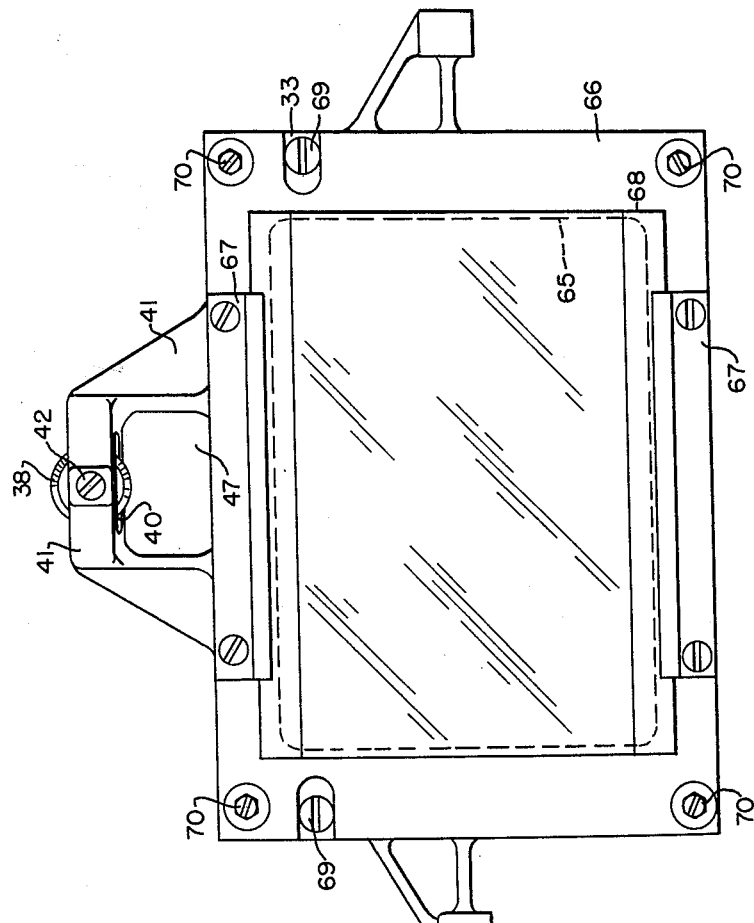
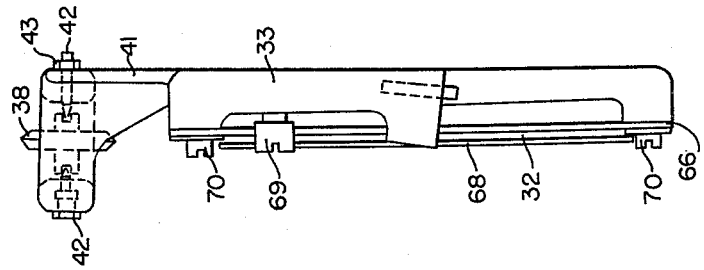
INVENTOR.
LAWRENCE S. WILLIAMS
BY
Marshall, Marshall & Yeasting
ATTORNEYS Jan. 22, 1963  L. S. WILLIAMS  3,074,496
WEIGHING SCALE
Filed Dec. 30, 1957  14 Sheets-Sheet 8
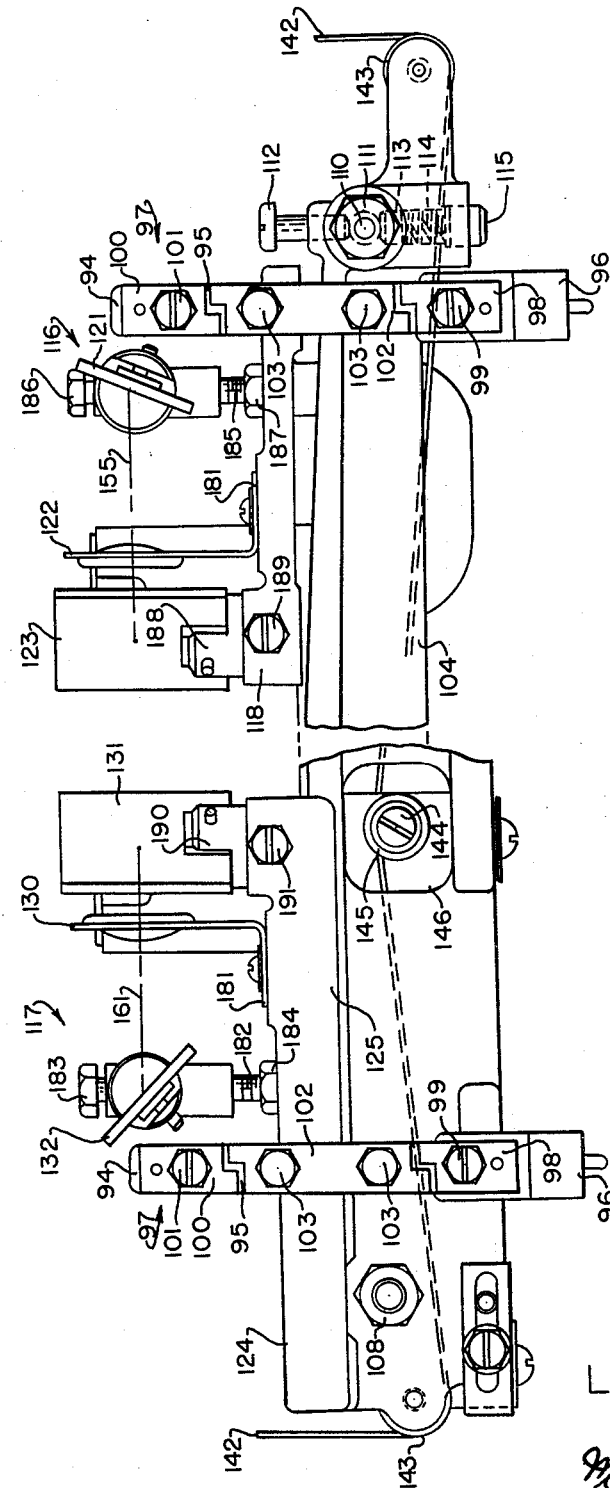
Fig. XI
INVENTOR.
LAWRENCE S. WILLIAMS
BY
Marshall, Marshall & Yeasting
ATTORNEYS

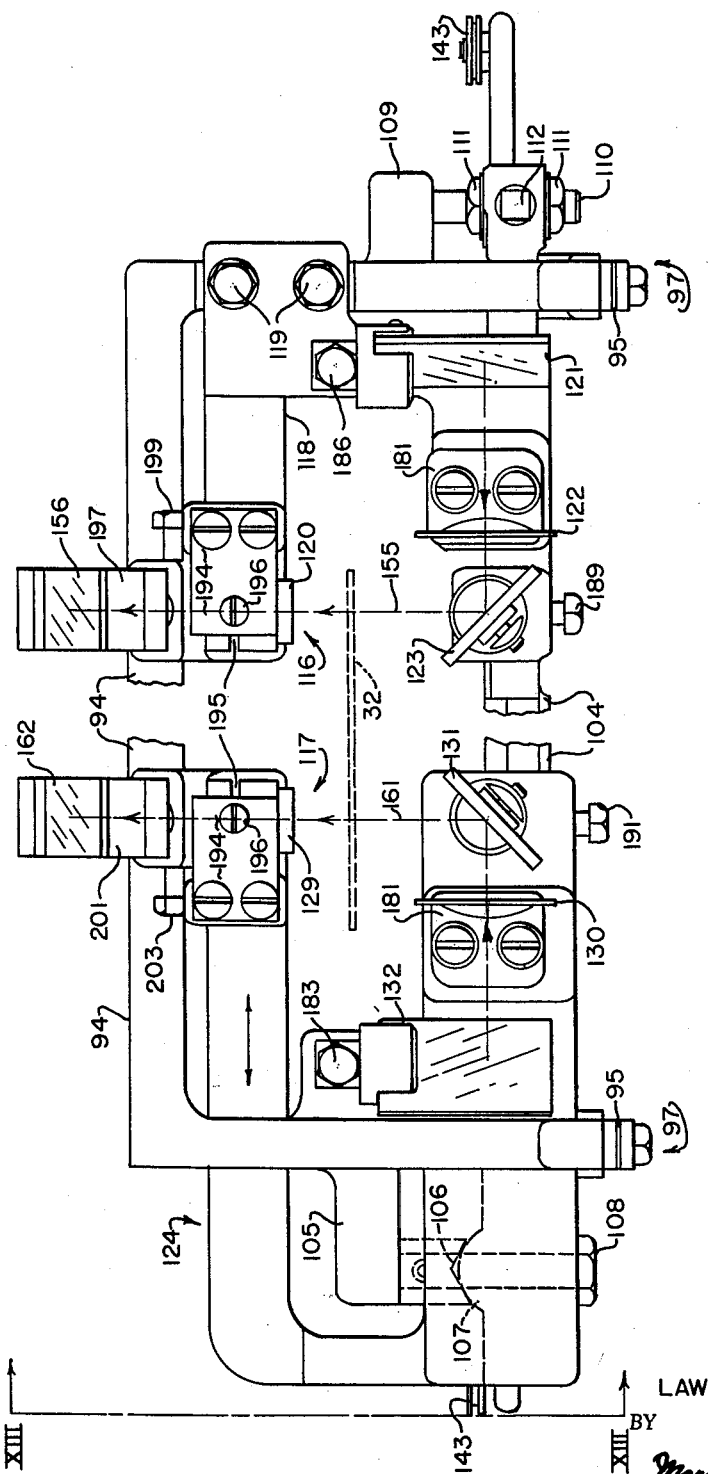

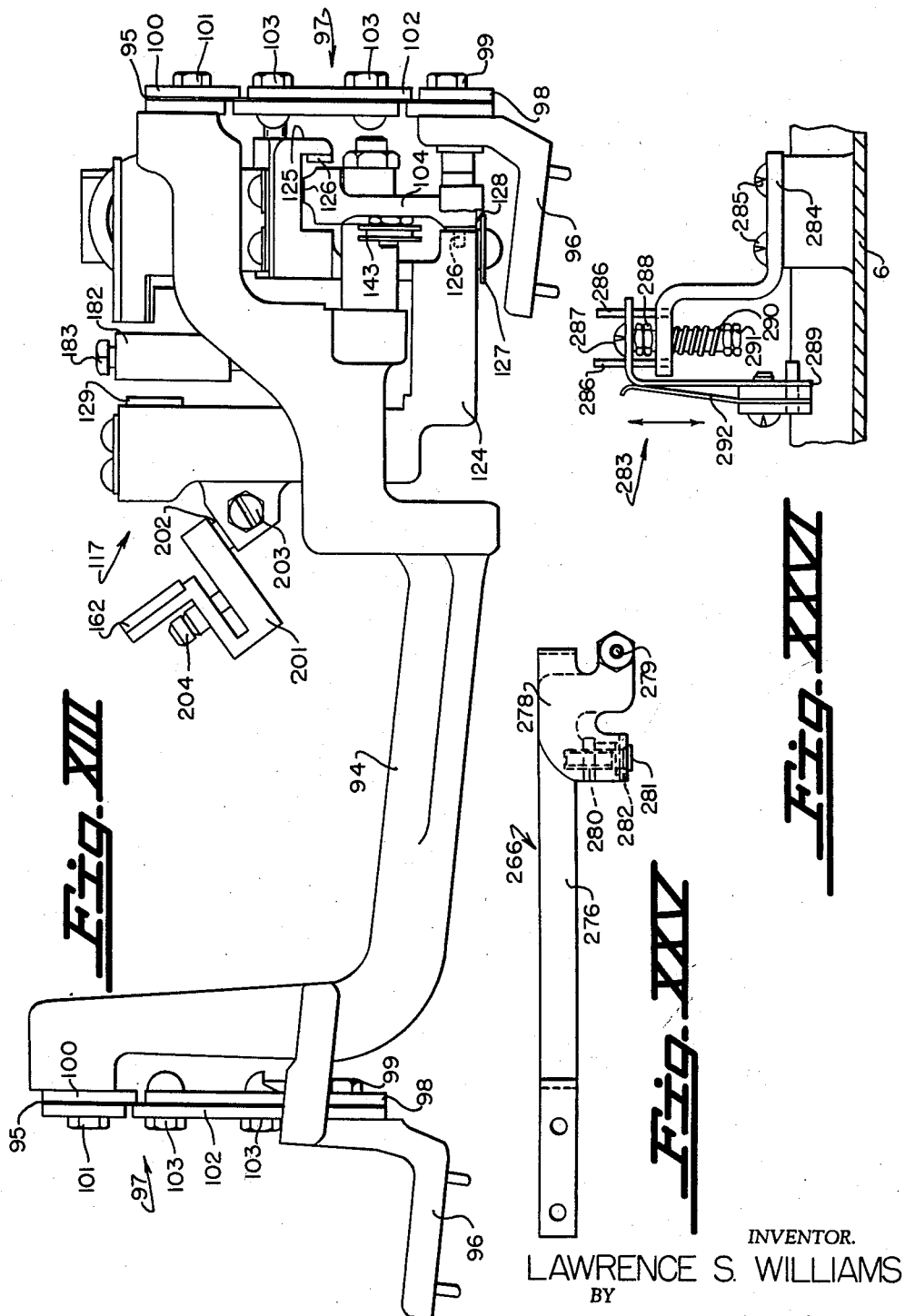

Jan. 22, 1963     L. S. WILLIAMS     3,074,496
WEIGHING SCALE
Filed Dec. 30, 1957     14 Sheets-Sheet 11
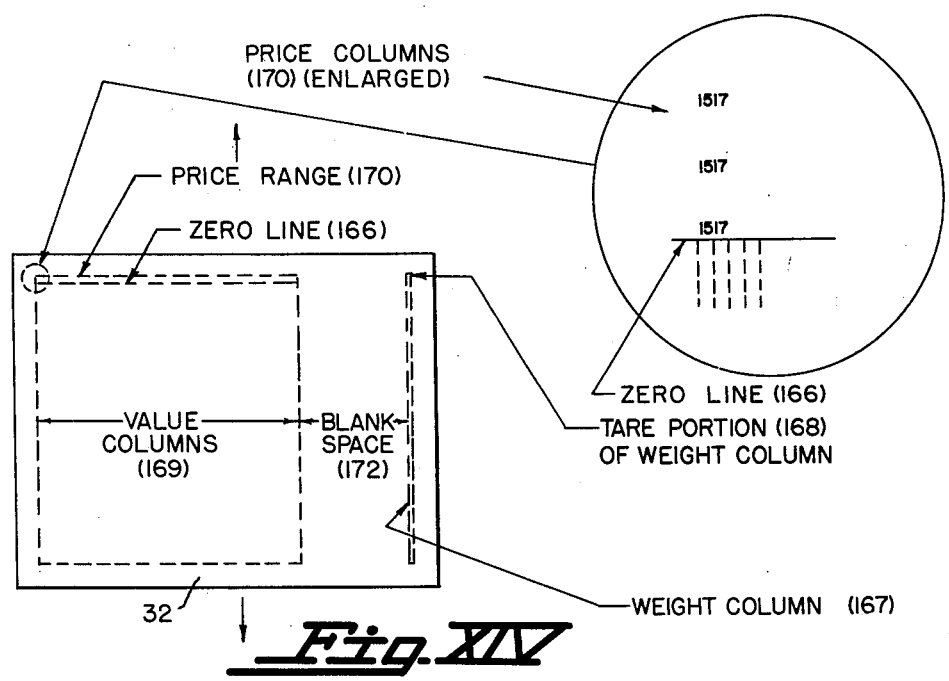
*Fig. XIV*
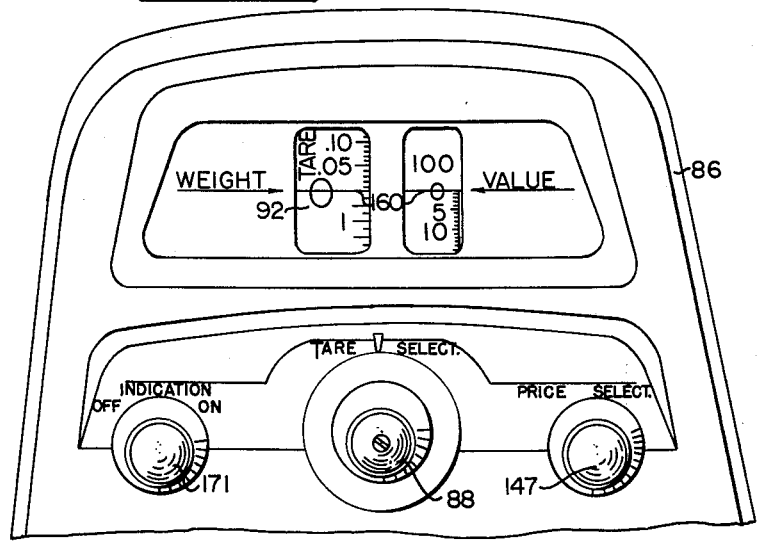
*Fig. XV*
INVENTOR.
LAWRENCE S. WILLIAMS
BY
*Marshall, Marshall & Yeasting*
ATTORNEYS

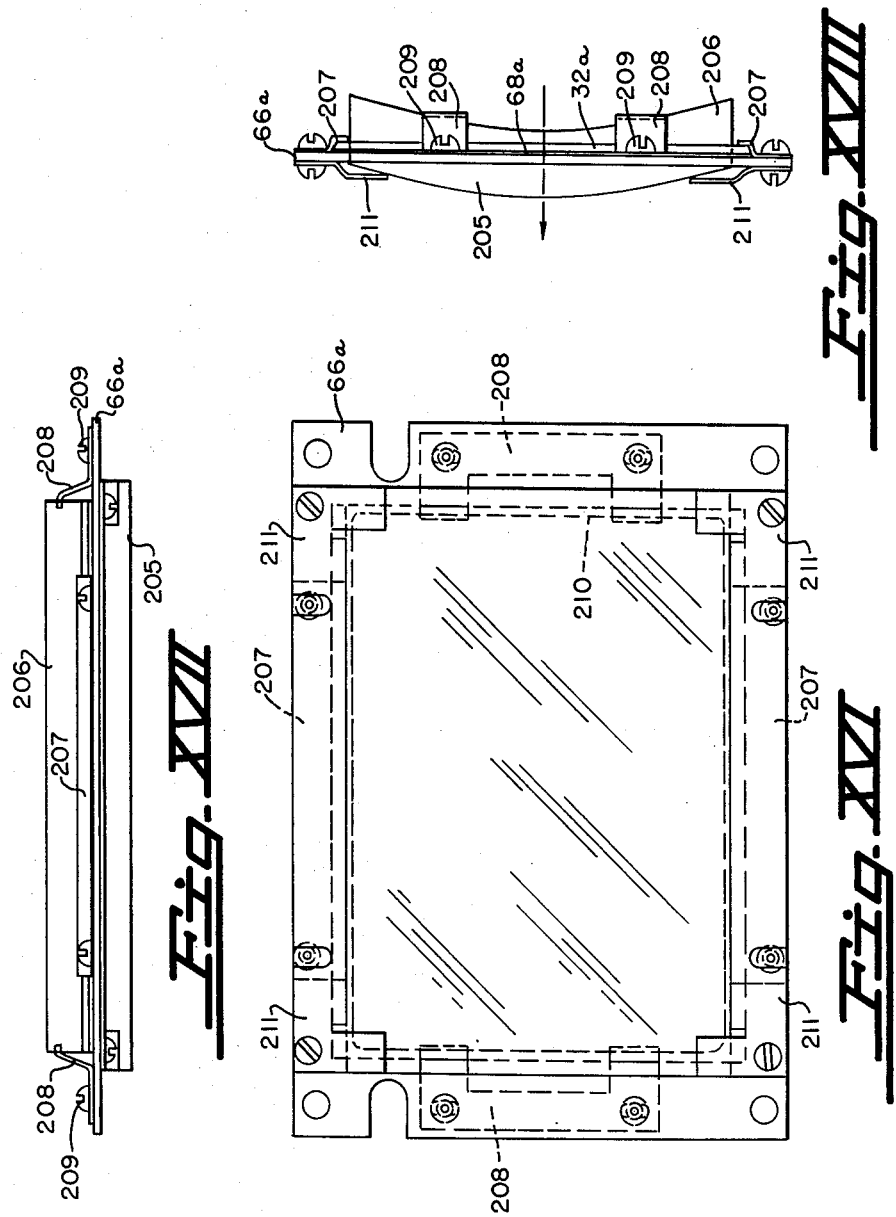

Jan. 22, 1963 L. S. WILLIAMS 3,074,496
WEIGHING SCALE
Filed Dec. 30, 1957 14 Sheets-Sheet 13
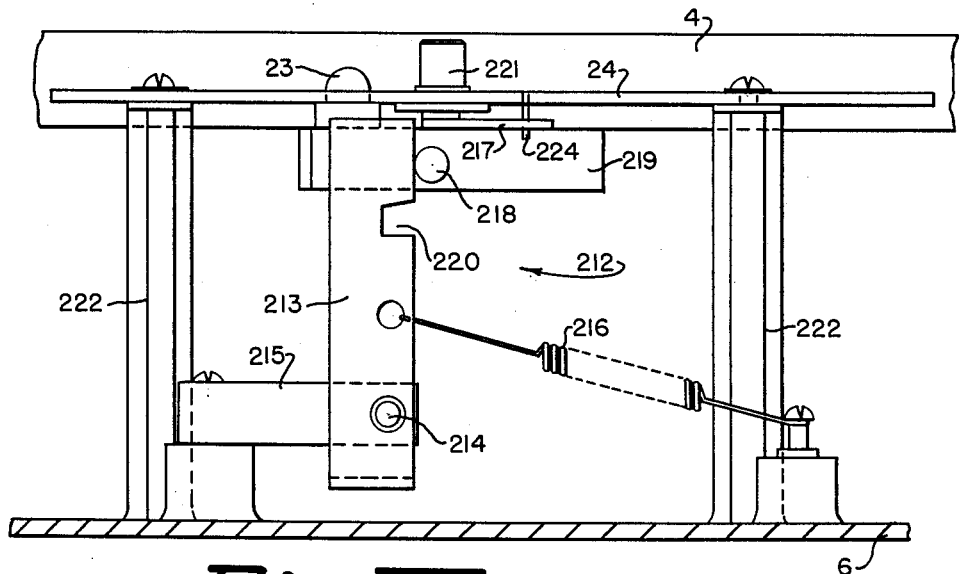
*Fig. XIX*
*Fig. XX*
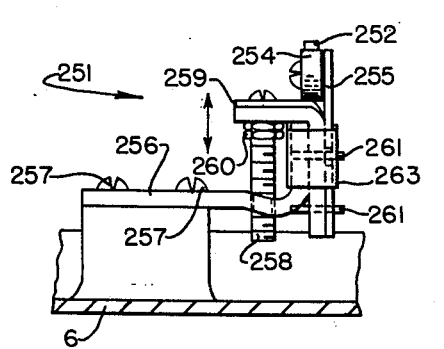
*Fig. XXIII*
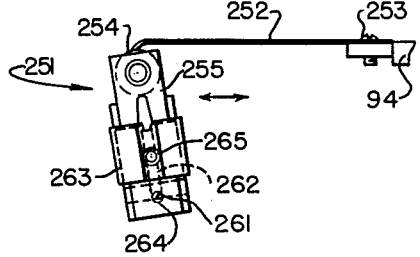
*Fig. XXIV*
INVENTOR.
LAWRENCE S. WILLIAMS
BY
Marshall, Marshall & Yeasting
ATTORNEYS

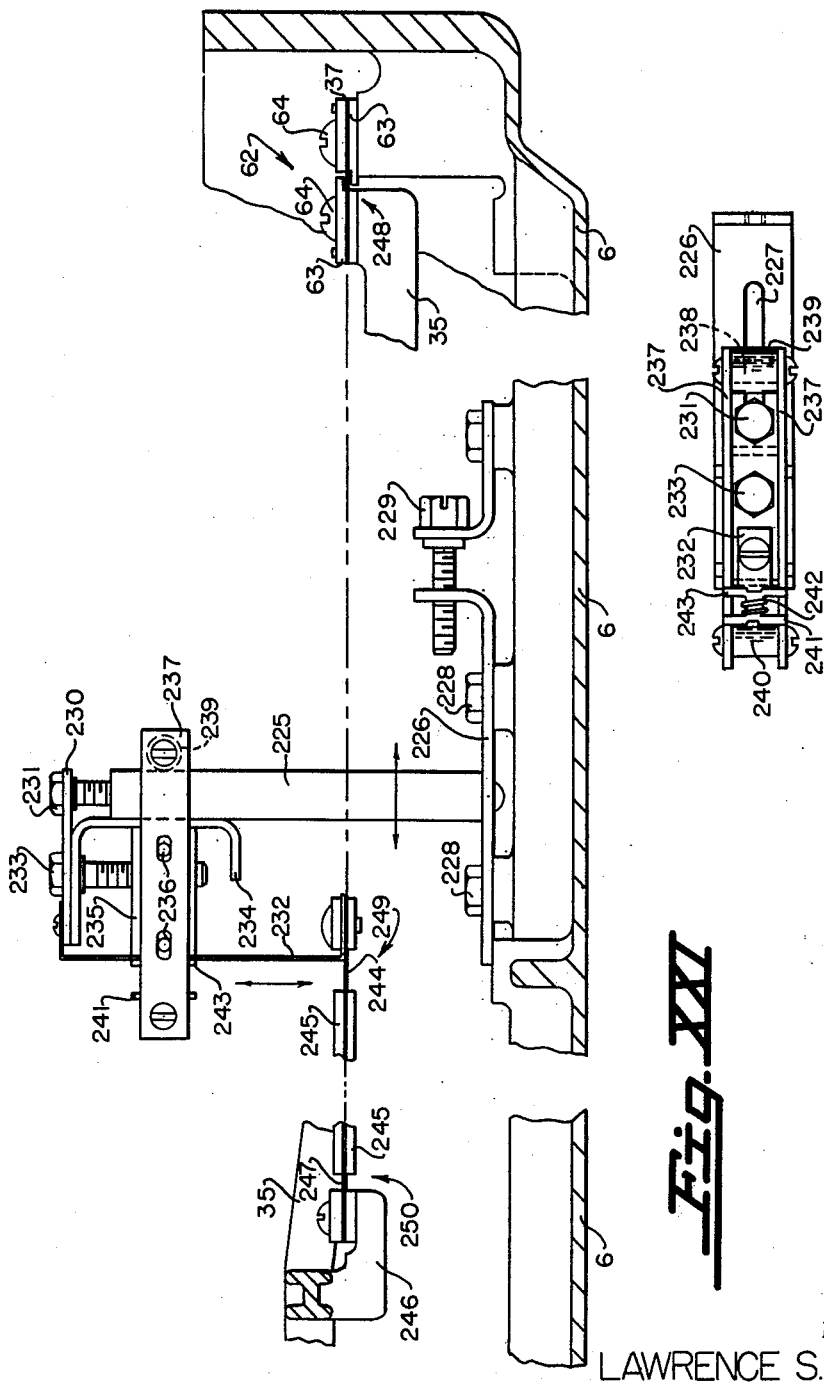

United States Patent Office 3,074,496
Patented Jan. 22, 1963

3,074,496
WEIGHING SCALE
Lawrence S. Williams, Toledo, Ohio, assignor to Toledo Scale Corporation, Toledo, Ohio, a corporation of Ohio
Filed Dec. 30, 1957, Ser. No. 705,857
3 Claims. (Cl. 177—178)

This invention relates to weighing scales and in particular to resilient calibrating means for adjusting the sensitivity of a weighing scale.

Since the beginning of the era of precision self-indicating weighing scales, correcting or calibrating devices have been used to insure that equal increments of load upon the scales cause uniform travel of the scales' indicating means, i.e., rotatable indicators or charts. Correcting or calibrating devices are required to compensate for small manufacturing errors, such as eccentric pinions in ordinary rack and pinion weighing chart drives, or fundamental errors, such as departures of weighing spring counterforces from Hooke's law caused, for example, by the reduction in diameter of a helical spring during extension.

There are many sources of such errors, but fortunately they have a common pattern. When plotted as ordinates above and below a straight line divided uniformly according to even divisions of the weighing scale charts, the errors form a harmonic curve. It follows, therefore, that if means are provided to produce equal and opposite harmonic correction effects, the errors can be canceled.

For many years such harmonic (or sine wave) corrections have been made by unbalancing the indicators or charts which, in making single turns, can, by unbalance, furnish sine wave error curves which are composites of half-waves and full-waves of any desired amounts or phases. In addition, most weighing scales have had the facility of a quarter-wave harmonic correction—in pendulum scales by altering the pendulum angle and in spring counterforce scales by changing the angle of a short link.

The prior calibrating devices, however, cannot be used with many of the modern weighing scales such as projected indication scales, which do not have ordinary indicators or charts to be unbalanced to furnish harmonic corrections, or multiple turn scales, which do not have ordinary single-turn indicators or charts to be unbalanced to furnish harmonic corrections. Furthermore, the prior calibrating devices were generally unsatisfactory because, by unbalancing the indicators or charts, they added to the meshing pressures of the rack and pinion indicator or chart drives.

It is, accordingly, the principal object of this invention to provide calibrating means which is suitable for adjusting the sensitivity of any weighing scale, including projected indication and multiple turn scales.

Another object of the invention is to provide an improved calibrating means for adjusting the sensitivity of a weighing scale having a rack and pinion indicator or chart drive in such a way that does not add to the meshing pressure of the drive.

Still another object is to provide a resilient calibrating means for adjusting the sensitivity of a weighing scale at its zero, one-quarter, one-half, three-quarter, and full capacity positions.

A further object is to provide a resilient calibrating means for adjusting the sensitivity of a weighing scale at its one-quarter and three-quarter capacity positions regardless of whether the scale has an inherent plus error at the one-quarter position and a minus error at the three-quarter position or an inherent minus error at the one-quarter position and a plus error at the three-quarter position.

Other objects and advantages will be apparent from the following description of preferred forms of the invention.

According to the invention, the sensitivity of a weighing scale at its zero, one-quarter (plus or minus error), one-half, three-quarter (plus or minus error), and full capacity positions is adjusted by applying suitable harmonic correction effects to the scale which are equal and opposite to the harmonic errors inherent in the scale, the correction effects being produced by adjustable resilient calibrating means attached to any suitable member which delivers forces to the scale. A projected indication weighing scale having an inherent plus error at its one-quarter capacity position and an inherent minus error at its three-quarter capacity position incorporating the resilient calibrator, which functions to introduce a canceling minus error at the one-quarter capacity position and a canceling plus error at the three-quarter capacity position, is illustrated in the accompanying drawings. Also, a projected indication weighing scale having an inherent minus error at its one-quarter capacity position and an inherent plus error at its three-quarter capacity position incorporating the resilient calibrator is illustrated in the accompanying drawings.

In the drawings:

FIG. I is a side elevational view of a projected indication weighing scale, parts being broken away and parts being shown in section for clarity of illustration;

FIG. II is an enlarged elevational view as seen from a position at the far side of the weighing scale which is illustrated in FIG. I, the upper part of the scale and certain adjuncts being broken away and other parts being shown generally in central section;

FIG. III is an enlarged detailed view of the lever connection which is illustrated in FIG. II;

FIG. IV is a fragmentary elevational view showing a modification of a drive for the scale's automatic focusing means which is illustrated in FIG. II;

FIG. V is a perspective view as seen from a position slightly to the left and above FIG. II looking down into the base of the scale, showing the resilient calibrating means of the invention for adjusting the sensitivity of the scale;

FIG. VI is an enlarged, fragmentary plan view showin, in detail, the resilient calibrating means attached to the scale;

FIG. VII is a perspective view of the upper part of the weighing scale with its housing removed to reveal inner details;

FIG. VIII is a perspective view of the back of the scale as seen from a position to the right of FIG. II looking toward the scale;

FIG. IX is a front elevational view of the chart assembly as seen from the line IX—IX of FIG. II looking in the direction indicated by the arrows;

FIG. X is an end elevational view of the chart assembly which is shown in FIG. IX;

FIG. XI is an elevational view in enlarged detail showing the optical projection systems which are illustrated in FIG. VIII;

FIG. XII is a plan view of the apparatus which is illustrated in FIG. XI;

FIG. XIII is an end elevational view as seen from a position along the line XIII—XIII of FIG. XII looking in the direction indicated by the arrows;

FIG. XIV is a schematic diagram of the chart which is illustrated in FIG. IX;

FIG. XV is a perspective view of the front of the upper part of the scale housing;

FIG. XVI is a front elevational view which is similar to FIG. IX and which shows a modified chart assembly;

FIG. XVII is a plan view of the chart assembly which is illustrated in FIG. XVI;

FIG. XVIII is an end elevational view of the chart assembly which is illustrated in FIG. XVI;

FIG. XIX is an enlarged, fragmentary side elevational view of the interior of that part of the scale shown in FIG. I which is concealed by the housing, showing a lever lock;

FIG. XX is a plan view of the lever lock cam illustrated in FIG. XIX;

FIG. XXI is a fragmentary, elevational view of a modified resilient calibrating means, attached to a scale, which is similar to the calibrating means illustrated in FIGS. V and VI;

FIG. XXII is a plan view of the resilient calibrating means shown in FIG. XXI;

FIG. XXIII is an end elevational view of the resilient calibrating means shown in plan in FIG. VI for adjusting the sensitivity of the scale at its one-quarter and three-quarter capacity positions;

FIG. XXIV is a side elevational view of the resilient calibrating means shown in FIG. XXIII;

FIG. XXV is a fragmentary side elevational view of the resilient calibrating means shown in plan in FIG. VI for adjusting the sensitivity of the scale at its zero and full capacity positions (span); and FIG. XXVI is a side elevational view of the resilient calibrating means shown in plan in FIG. VI for adjusting the sensitivity of the scale at its one-half capacity position.

These specific figures and the accompanying description are intended merely to illustrate the invention and not to limit its scope.

Referring generally to FIGS. I–VIII, the force of gravity acting on a load placed upon a load receiver or platter 1 is transmitted through a spider 2 and load bearings 3 to a second class main lever 4 fulcrumed on bearings 5 in a base 6 of the projected indication weighing scale. These load forces acting on the lever 4 are transmitted to a helical load counterbalancing spring 7 which is connected at its upper end through a calibrator clamp 8 to a frame 9 of the scale and at its lower end through a second calibrator clamp 10 to the end of the lever. The weighing mechanism, i.e., the spring 7, is movable with the lever 4 and movable relative to the frame 9.

The pivotal connections for connecting the lever 4 to the spider 2 and to the base 6 of the scale include the ball bearings 3 and 5 instead of the usual knife edges and V-bearings to eliminate friction and to aid in maintaining the optical projection system, hereinafter described, in focus. Each of the pivotal connections comprises a stud 11 that is positioned in a transverse groove 12 milled in the lever 4 and clamped by a cover plate 13 attached to the lever by means of a pair of screws 14. The studs 11 extend laterally either side of the side portions of the lever 4, there being two of the studs provided for the fulcrum axis and two provided for the load pivot axis. The studs are extended inwardly toward each other or outwardly as shown according to the available space and required lateral stability. The studs 11 engage the inner races of the ball bearings 3 and 5 mounted within cup-shaped housings 15 that are clamped in pedestals 16 of the base 6 or in the spider 2. The bearing housings 15 are clamped in position by straps 17 fitting over the housings and held in place by screws 18. The main lever 4, thus, is supported at its one end by the fulcrum bearings 5 and at its other end by the load counterbalancing spring 7 and the spider 2 is hung from the lever 4 by means of the load bearings 3.

The spider 2 is held in an upright position by an ordinary check link 19 one end of which is pivotally connected by means of ball bearings to a leg 20 (FIG. II) of the spider 2 and the other end of which is pivotally mounted by means of ball bearings in an adjustable pedestal 21 (FIGS. II and III) in the base 6 of the scale. In order that the scale shall weight accurately for all positions of a load thereupon, it is necessary that the effective length of the check link 19 shall be exactly equal to the distance between the fulcrum axis and the load pivot axis of the lever 4 and that the check link be exactly parallel to the pivot line of the lever for all positions occupied by the lever during normal weighing operations. Such positions occupied by the lever are limited by a lower rubber stop 22 attached to the base 6 of the scale and by an upper rubber stop 23 attached to a stationary platform 24 erected from the base which limit stops may engage the lever at the extreme ends of its range of travel.

A dash pot 25 is mounted on the base 6 of the scale and has its plunger 26 pivotally connected to an arm 27 extending from the spider 2. The dash pot 25 serves to prevent continued oscillation of the lever system following a change in load.

The load receiver or platter 1 is removably mounted on four posts 28 erected from the spider 2. The upper parts of two of the posts 28 have circular grooves 29 (FIGS. I, V, and VII) therearound and the other posts 28 have cylindrical depressions 30 (FIG. V) in their upper ends. A pair of clips 31 on the bottom of the platter 1 (FIG. I) engage the circular grooves 29 and a pair of tenons (not shown) also on the bottom of the platter 1 fit into the cylindrical depressions 30. In order to remove the platter from the scale, the front end of the platter is elevated to lift the tenons from the depressions and the platter is moved forward to clear the clips 31 from the posts.

A chart 32, which carries appropriate indicia with respect to weight, unit price and computed value of the material to be weighed on the scale, is mounted on a generally rectangular frame 33 which is connected to the spring supported end of the lever 4 by a lever connection 34 and to the end of the chart lever 35 by a pair of flexure ribbons 36, the chart lever 35 being pivotally attached in turn at its other end to the base of the scale by a second pair of flexure ribbons 37. Greatly enlarged images of the indicia on the chart, which is movable with the levers 4 and 35, are projected by means of an optical system onto a display screen hereinafter described to be read by the scale operator and/or the customer.

The lever connection 34 and the pair of flexure ribbons 36 provide a three-point mounting for the chart 32, the lever connection absorbing horizontal movements of the lever 4 so that such movements will not disturb the chart 32. Absorption of the horizontal movements of the lever 4 is accomplished by the turning of a wheel 38 of the lever connection 34 that floatingly supports the chart 32 in a V-bearing 39 (FIG. III) on the lever 4. The wheel 38 is supported in an opening 40 in an upstanding extension 41 of the chart frame 33 for rotation between the ends of opposed cone-pointed screws 42 that are threaded through the extension 41, the right-hand screw 42, as viewed in FIG. III, being held in adjusted position by a lock nut 43. The weight of the chart frame 33 and the parts associated therewith hold the wheel 38 down under the influence of gravity in a V-notch 44 in the bearing 39.

The lever 4 includes a transverse portion 45 having an extension 46 that protrudes horizontally through a hole 47 in the upstanding extension 41 of the chart frame 33. A groove 48 in the extension 46 of the lever 4 functions to slidably receive the V-bearing 39 which is adjustably held in the groove 48 by means of a pair of screws 49 and 50. The screw 49 extends through a hole 51 (FIG. III) in the transverse portion 45 of the lever in a sloppy fit and is threaded into the V-bearing 39, a washer 52 keeping the head of the screw 49 out of the hole. The screw 50 is an adjustable screw of the shoulder type which fits within a collar 53 in a retaining plate 54, attached to the extension of the lever portion 45 by a pair of screws 55, and which has an end 56 threaded into the V-bearing 39. When the adjustment screw 50 is turned, shoulder portions 57 of the screw 50 prevent it from moving axially and the threaded end 56 of the screw pushes or pulls the V-bearing 39 to the left or to the right, respectively, as viewed in FIG. III to locate the V-notch 44 relative to the periphery of the wheel 38. Such movement of the bearing is permitted by the sloppy fit of the screw 49 in the hole 51, the screw 49 moving back or forth horizontally in the hole 51 as the bearing is shifted.

The wheel 38 which, as hereinbefore described, is floatingly held in the V-notch 44 by gravity is prevented from accidentally being jolted out of the V-notch by means of a limit stop spring 58 that has one end attached at 59 to the portion 45 of the lever 4. The free end of the spring 58 is so held by a resilient lock member 60, attached to the portion 45 of the lever 4 at 61, that the spring 58 is positioned in juxtaposition with, but never touching normally, the periphery of the wheel 38. As illustrated in FIG. III, the distance between the wheel 38 and the spring 58 is less than the depth of the V-notch 44.

The flexure ribbons 36 and 37 may be protected by limit stop guards 62 to prevent them from buckling under unusual forces. Each of the guards 62 includes a pair of clamp members 63 on one side of the flexure ribbon and another pair of clamp members on the other side of the flxure ribbon, the clamp members in each pair of members being spaced slightly from each other and being slightly relieved adjacent the bending area of the flxure ribbon to permit the flxure ribbon to bend without touching the guard within limits. Screws 64 which hold the clamp members together and which also attach the clamp members to the several points in the scale also serve to hold the flexure ribbons between the clamp members in sandwiched form.

Referring to FIGS. IX and X in particular, FIG. IX being a view looking into the front of the chart 32 in contrast to FIG. VIII which is a view looking into the back of the chart, the chart 32 is clipped over a large opening 65 in a rectangular plate 66 by clips 67, there being a glass cover 68 between the clips and the chart to protect it. The chart 32, the cover 68 and the plate 66 make up a chart assembly which is first adjustably attached during assembly of the scale to the chart frame 33 by a pair of eccentric screws 69 and positioned by means of the screws 69 to locate the chart 32 square with the motion of the scale and then fixedly attached to the chart frame 33 by four clamp screws 70.

Referring to FIG. II in particular, the main lever 4 and the chart lever 35 form the opposite sides of a parallelogram 71 in all positions occupied by the levers during normal weighing operations. The main lever side of the parallelogram 71 is represented by the broken line 72 which is drawn from the center of the fulcrum axis stud 11 to the lowest point on the periphery of the wheel 38 and the chart lever side of the parallelogram is represented by the broken line 73 which is drawn from the axis of flexure of the chart lever flexure ribbon 37 through the axis of flexure of the chart frame flexure ribbon 36. The plane of the indicia-bearing chart 32 forms the right-hand side of the parallelogram 71 as viewed in FIG. II and the left-hand side is represented by the broken line 74 which is drawn from the center of the fulcrum axis stud 11 through the axis of flexure of the chart lever flexure ribbon 37. The indicia-bearing chart 32 moves in an arcuate path such that the chart has a component of motion normal to its face along with the ends of the pair of levers 4 and 35. The plane of the chart 32, because of the parallelogram geometry, in any position in its arcuate path is parallel to the plane of the chart in any one of its other positions in the path. This helps in maintaining the optical projection system in focus.

The extension of the load counterbalancing spring 7, which is proportional to the load upon the platter 1, permits the spring supported end of the main lever 4 to drop a distance proportional to the load and this movement is transmitted to the chart 32, directly attached to the lever, to move the chart through equal increments for equal increments of load on the scale, the spring 7 being rigidly attached to the lever 4 by means of the calibrator clamp 10. The upper end of the spring 7 is rigidly connected by the calibrator clamp 8 to a threaded rod 75 (FIGS. I and VII) attached at its upper end to a trunnion 76 having horizontally extending pins 77 which rest in V-shaped bearing surfaces 78 of a bifurcated portion 79 of a bell crank 80, the threaded rod 75 being rockable about the axes of the pins 77. The bell crank 80 is rockable about the axes of cone-pointed screws 81 which are threaded through the ears 82 of a bracket 83 fixedly mounted on a shelf 84 that is supported by four posts 85 erected from the base 6 of the scale, the posts 85 and the shelf 84 forming the frame 9 which is covered by a suitable housing 86 the top of which is illustrated in FIG. XV. The screws 81 cooperate with conical depressions in the bell crank 80 and are held against turning by lock nuts 87 which are so adjusted that the bell crank is free to rock yet is mounted with a minimum of play.

The bell crank 80 may be rocked either by turning a tare knob 88 which is located exteriorly of the housing 86 on the end of a sleeve-like screw 89 that is threaded through the bracket 83 to move an end of a second screw 90 threaded within the sleeve-like screw toward or away from the lower arm of the bell crank, or the bell crank may be rocked by directly turning the second screw 90 and holding the sleeve-like screw 89 stationary. Force provided by the spring 7 always urges the bell crank 80 against the end of the second screw 90 and the pins 77 against the bearing surfaces 78 of the bifurcated portion 79 of the bell crank. When the sleeve-like screw 89 is turned by the tare knob 88, the second screw 90 always turns with it as one because the second screw is threaded through the inside of a coil which is not shown but which is threaded in turn into a threaded part of the sleeve-like screw. The screw 90 can be turned relative to the screw 89 by holding the knob 88 with one hand and by turning the screw 90 by means of a screw driver, the kerf 91 of the screw 90 being about flush with the outer surface of the tare knob 88 as shown in FIG. VII.

In order that the tare weight of a container placed upon the platter 1 may be offset, the tare knob 88 is turned clockwise as viewed in FIGS. II and XV to advance the end of the screw 90 toward the bell crank 80 until zero weight is indicated on a display screen 92 (FIGS. I, VII and XV) fixedly attached to a pair of posts 93 erected from the shelf 84 of the frame 9. (The optical system for projecting images of the indicia on the chart 32 onto the screen 92 will be described hereinafter.) This rocks the bell crank 80 about the axes of the cone-pointed screws 81 and lifts the spring supported end of the main lever 4 and the chart 32 operating in unison therewith upward a distance equal to the distance which the end of the lever moved downward under the influence of the tare weight of the container upon the platter. Zero adjustment is made by holding the tare knob 88 stationary and turning the screw 90 to rock the bell crank 80 and position the spring 7 and the spring supported end of the lever 4 along with the parts operating in unison therewith.

In operation, the zero adjustment is made first by holding the tare knob 88 stationary and turning the screw 90 until zero weight indication is displayed on the screen 92 when no load is upon the platter 1. A container to be filled is then placed upon the platter and the tare knob is turned until zero weight indication is displayed again on the screen 92. After the container is filled, the correct weight of the net load in the container is indicated on the screen 92.

The scale is provided with an optical system which is simple to operate and which produces brilliant, easy-to-read projected images of the weight, unit price and computed value indicia on the display screen 92. The system includes an optical frame 94 which is pivotally mounted like a cradle by means of flexure ribbons 95 from three feet 96 rigidly connected to the base 6 of the scale. One of the feet 96 is located near the center of the base 6 and the other two feet are located at the back of the base. Each of the flexure ribbons 95 has two bending areas provided by guards 97 each of which includes a lower pair of clamps 98 attached to a foot 96 by a screw 99, an upper pair of clamps 100 attached to the optical frame 94 by a screw 101 and a center pair of clamps 102 attached to a flexure ribbon 95 by screws 103, the flexure ribbons 95 being sandwiched between the clamps in each pair of clamps. The ends of the center clamps 102 are spaced slightly from adjacent ends of the end clamps 98 and 100 to permit each of the flexure ribbons 95 to have two bending areas. Such clamp ends are formed with a relieved area adjacent the flexure ribbons to space the clamp ends far enough from the flexure ribbons to permit the flexure ribbons to bend without touching the clamps within limits and, thus, prevent the flexure ribbons from buckling under unusual forces.

An adjustably mounted side rail 104 is carried by the pivotally mounted optical frame 94 closely adjacent to and parallel with the chart 32. The left-hand end of the slide rail 104 as viewed in FIG. XII is pivotally attached to an ear 105 of the optical frame which has a V-notched bearing surface 106 that cooperates with a cylindrical surface 107 of the slide rail. A screw 108 holds the surfaces 106 and 107 together. The right-hand end of the slide rail 104 is adjustably attached to an ear 109 of the optical frame 94 by a stud 110 that is threaded into the ear 109 and that extends through an oversize opening in the slide rail in a sloppy fit. Lock nuts 111 threaded on the stud 110 against each side of the slide rail 104 are provided to hold the slide rail in a position on the stud which is adjustable along the axis of the stud and an adjustment screw 112 threaded through the slide rail against the stud 110 is provided to force the stud toward a member 113 that is located in a vertical cylindrical hole in the bottom of the slide rail and that is urged toward the stud by means of a coil spring 114 which is held in place by a screw 115. When the screw 108 at the lefthand end of the slide rail 104 and the lock nuts 111 at the right-hand end of the slide rail are loosened, the slide rail can be pivoted about the horizontal axis of the screw 108 by turning the adjustment screw 112, or the slide rail can be pivoted about a vertical axis between the V-notched bearing surface 106 of the ear 105 of the optical frame and the cylindrical surface 107 of the slide rail. The screw 108 and lock nuts 111 are retightened to hold the slide rail in adjusted position. The purpose of such adjustments is explained hereinafter together with several other adjustments provided for the optical projection system.

The optical system is divided into a weight projection subassembly 116 stationarily mounted on the right-hand end of the optical frame 94 as viewed in FIG. VIII and a unit price and computed value projection subassembly 117 shiftably mounted on the left-hand end of the slide rail 104. The weight projection subassembly 116 includes a generally U-shaped bracket 118 fixedly attached by screws 119 to the optical frame 94 adjacent the ear 109 on the frame, the legs of the U straddling an end of the chart 32 as shown in FIG. XII, on which bracket 118 a projection lens 120 is adjustably mounted at one side of the chart 32 and a first mirror 121, a condensing lens 122 and a second mirror 123 are adjustably mounted at the other side of the chart.

The unit price and computed value projection subassembly 117 includes a generally U-shaped carriage 124 having a hooked portion 125 (FIG. XIII) which is slidable on the slide rail 104, the legs of the U straddling an end of the chart 32 as shown in FIG. XII. The hooked portion 125 of the carriage is provided with a suitable number of slide buttons 126 three of which are shown in FIG. XIII. Gravity tends to rotate the carriage 124 counterclockwise, as viewed in FIG. XIII, about the slide rail 104 so that the buttons are continuously forced against the slide rail to keep play out of the system, while that part of the hooked portion 125 of the carriage to the right of the slide rail as viewed in FIG. XIII prevents the carriage from coming off of the slide rail. Limit stop washers 127 on the carriage which are spaced at 128 from the bottom of the slide rail 104 prevent the carriage from being lifted from the slide rail within limits. A projection lens 129 is adjustably mounted on the carriage 124 at one side of the chart 32 and a condensing lens 130 and a mirror 131 are adjustably mounted on the carriage at the other side of the chart. A stationary mirror 132 is adjustably mounted on the optical frame 94 adjacent the ear 105 on the frame.

The carriage 124 is selectively shiftable on the slide rail 104 in a path parallel to the chart 32 as indicated by the double-ended arrow in FIG. XII by means of a cord drive part of which is illustrated in perspective in FIG. VII. The cord drive comprises an upper cord 133 which runs over a pair of idlers 134, one of which is shown in FIG. VII, mounted on brackets 135 adjustably attached to the shelf 84 of the frame 9, around a spool 136 fixed on a shaft 137 rotatably supported at its ends in a bracket 138 mounted on a pair of posts 139 erected from the shelf 84 and over a third idler which is not shown but which is like the idlers 134 and which is mounted on a bracket 140 carried by the shelf 84 at the same elevation as the spool 136. The upper cord 133 is attached by springs 141, one of which is shown in FIG. VII, one at each of its ends to the ends of a lower cord 142 which is of the same length as the upper cord. The springs 141 function to keep the cords under tension and, thus, prevent play in the cord drive. The lower cord 142 runs over a pair of pulleys 143 (FIG. XI) mounted one on each end of the slide rail 104 and is fixedly clamped to the carriage 124 by means of a screw 144 and a washer 145 which can be seen in FIG. XI through an opening 146 in the slide rail. The carriage 124 may be shifted back or forth on the slide rail 104 by turning a price selector knob 147 fixedly attached to the end of the shaft 137 exteriorly of the housing 86 which turns the spool 136 and drives the cords 133 and 142 in the selected direction.

A main and a reserve light source (FIGS. I and VII) is provided for the weight projection subassembly 116 and for the unit price and computed value subassembly 117; it consists of a lamp or bulb 148 of the double filament type which is mounted in a socket plate 149 that is fixedly attached to a socket block 150 secured to a bracket 151 fixedly attached to the back of a plate 152 that is hung from the back of the shelf 84 of the frame 9.

Two condensing lenses 153 and 154 are adjustably mounted on the plate 152. A light beam projecting images of weight indicia, which is represented by the long dash line 155 in FIG. I, emanates from the lamp 148 and passes first through the condensing lens 153 to the mirror 121 which turns it horizontally and parallel to the chart 32 (See FIGS. XI and XII). The beam 155 then passes through the condensing lens 122 to the mirror 123 which turns it through 90° (FIG. XII) and causes the beam to travel in the proper direction to pass through a weight column (FIG. XIV) of the chart 32 and through the projection lens 120 to a mirror 156 adjustably attached to the bracket 118 which turns it as indicated in FIG. I so that it travels upwardly to a mirror 157 attached to a pair of posts 158 erected from the shelf 84 of the frame 9. The beam 155 is reflected by the mirror 157 to the display screen 92 having a frosted front surface 159 with an index line 160 thereon.

A second light beam projecting images of unit price and/or computed value indicia, which second beam also is represented by the dash line 155 in FIG. I, since in FIG. I one beam is directly behind the other beam, but which second beam is represented by the dash line 161 in FIGS. XI and XII, emanates from the lamp 148 and passes first through the condensing lens 154 to the mirror 132 which turns it horizontally and parallel to the chart 32. The beam 161 then passes through the condensing lens 130 to the mirror 131 which turns it through 90° (FIG. XII) and causes the beam to travel in the proper direction to pass through unit price and/or value columns (FIG. XIV) of the chart 32 and through the projection lens 129 to a mirror 162 adjustably attached to the carriage 124. The mirror 162, as viewed in FIG. I, is directly behind and hidden by the mirror 156. The mirror 162 turns the beam upwardly so that it travels to a mirror 163 (FIG. VII) which is in the same plane as the mirror 157 and which reflects the beam onto the display screen 92.

Provision is made by means of suitable baffles or shields for preventing possible interference of the several light beams carrying the different images in the optical sytem and for shielding the optical system from stray reflected light rays. A vertical baffle 164 carried by the shelf 84 of the frame 9 is located between the "Weight" indication part of the screen 92 and the "Value" indication part of the screen, thus, separating the mirror 157 from the mirror 163. A shield 165 attached to the plate 152 surrounds the bottom and one side of the lamp 148.

The weight, unit price and computed value columns of the chart 32 are shown schematically in FIG. XIV and are shown as they actually appear in their projected form in "Weight" and "Value" windows which are located in front of the display screen 92 in FIG. XV. The chart 32 as shown in FIG. XIV is oriented in the way that it appears looking into the back of the scale (see FIG. VIII), except that it is shown inverted in FIG. XIV for clarity of illustration. In its inverted position in FIG. XIV, the indicia are upright and are movable in response to movement of the weighing mechanism in directions indicated by the vertical arrows.

In operation when no load is upon the platter 1, the zero line 166 on the chart 32 is located opposite to and in alignment with the optical axes of the projection lenses 120 and 129. The zero indicium in the weight column 167 is projected as an inverted image by the weight projection subassembly 116 onto the display screen 92 at the index line 160 in the "Weight" window as shown in FIG. XV. Above the index line 160 in the window is displayed images of part of the tare portion 168 of the weight column and below the index line 160 is displayed images of part of other indicia in the weight column 167. The zero indicium in one of the value columns 169 is projected as an inverted image by the unit price and computed value projection subassembly 117 onto the display screen 92 at the index line 160 in the "Value" window. Above the index line 160 in the window is displayed images of one or perhaps two like unit price indicia in the price range 170 and below the index line 160 is displayed images of part of the indicia in one of the value columns 169, there being a wide range of unit prices on the chart 32 and a vertical column of computed value indicia above each unit price which values are computed for various weights of commodities at a particular price. The image of the particular unit price displayed along with the image of its computed value column depends on the position of the selectively shiftable carriage 124 which carries the projection lens 129 along the slide rail 104. As shown in FIG. XV, the unit price "100" appears in the "Value" window representing a price of one dollar per pound of a commodity to be weighed. The operator of the scale, from a position in front of the scale, selects the desired unit price of the commodity to be weighed by turning the price selector knob 147 which reciprocates the carriage 124 along the slide rail 104 to direct the beam projecting images of unit price and/or computed value indicia through a selected column of indicia until the image of the selected unit price indicia appears in the "Value" window. As previously indicated, images of one or perhaps two like price indicia in the price range 170 are displayed. This is caused by there being several identical unit price indicia in each one of the price columns as illustrated in the upper right-hand portion of FIG. XIV.

After the correct unit price is selected by the operator so that its image is displayed on the screen 92 in the "Value" window, a container for the commodity to be weighed is placed upon the platter 1. This causes the spring-supported end of the main lever 4 to move downward carrying with it the chart 32. Downward movement of the chart 32 moves the zero line 166 on the chart away from the optical axes of the projection lenses 120 and 129 and indicia in the weight column 167 are displayed in the "Weight" window and computed value indicia in the selected one of the value columns 169 are displayed in the "Value" window, the weight of the container being indicated by the index line 160. The operator then turns the tare knob 88 to lift the spring-supported end of the main lever 4 until zero weight indication is again displayed.

The commodity to be weighed then is placed in the tared off container and the chart 32 again moves downward until the net weight of the commodity is indicated in the "Weight" window and the value of such commodity computed according to the selected unit price is indicated in the "Value" window. Such downward movement of the chart 32 moves the price range 170 on the chart completely out of the field of view of the projection lens 129 so that unit prices are no longer displayed on the screen 92. If the operator knows the tare weight of the container before he begins the weighing cycle, he may turn the tare knob 88 until such tare weight is indicated in the "Weight" window and then place the filled container on the platter 1. The correct net weight of the commodity is then indicated in the "Weight" window. When the filled container is removed from the platter 1, the tare weight of the container again is indicated by the projected image of the tare portion 168 of the weight column 167 in the "Weight" window.

Adjacent the tare selector knob 88 and the price selector knob 147 which are both located exteriorly of the housing 86 is located a switch knob 171 for turning the lamp 148 on and off. As hereinbefore described, the vertical baffle 164 is located between the "Weight" indication part of the screen 92 and the "Value" indication part to prevent possible interference between the several light beams carrying the different images in the optical system. Such interference is prevented at the origin of the images by separating the value columns 169 from the weight column 167 by a blank space 172 on the chart 32 (FIG. XIV).

At hereinbefore described, the main lever 4 and the chart lever 35 form the opposite sides of a parallelogram in all positions occupied by the levers during normal weighing operations. The chart 32 forms a third side of such parallelogram and moves in an arcuate path such that the chart has a component of motion normal to its face along with the ends of the levers, the plane of the chart in any position of the chart in its path being parallel to the plane of the chart in any one of its other positions in the path. To compensate for the component of motion of the chart, means movable with a lever are provided for automatically focusing the optical projection system. Such movable means includes the optical frame 94 which is pivotally mounted as hereinbefore described from the three feet 96 that are rigidly connected to the base 6 of the scale. The pivotally mounted optical frame 94 is connected by a flexure ribbon 173 (FIGS. II and V) protected by guards 174, which are shown in FIG. V but not in FIG. II, which are like the guards 62 hereinbefore described, to a drive link 175 that is pivotally connected in turn by means of ball bearings 176 (FIG. II) to a bifurcated member 177 on the chart lever 35. The flexure ribbon 173 is connected to the optical frame 94 by a screw 178 and to the drive link by a screw 179. As the chart 32 moves back and forth with the chart lever 35 to which it is attached, the chart lever 35 moves the optical frame 94 a corresponding distance back and forth to maintain the physical distance between the projection lenses 120 and 129, carried by the optical frame 94, and the chart 32 approximately constant to keep the optical system in focus. For the best focus, i.e., so as to keep the images of the chart on the screen sharp, the projection lenses are moved a distance which is slightly more than the component of motion of the chart that it is intended to correct.

Alternatively, the drive link 175 may be connected similarly to the main lever 4 and to the top of the optical frame 94 as shown in FIG. IV. Reference numbers in FIG. IV which are similar to those in FIG. II identify parts which are similar in structure and in function.

The optical system is provided with several adjustments for focusing and aligning the various elements therein. As hereinbefore described, the slide rail 104 is pivotal about a vertical axis between the V-notched bearing surface 106 of the ear 105 of the optical frame 94 and the cylindrical surface 107 of the slide rail 104 to position the slide rail relative to the chart 32 so that the projection lens 129 is moved by the carriage 124 in a path which is parallel to the chart to maintain a uniform distance between the chart and the projection lens for focus. The slide rail 104 is also pivotal about the horizontal axis of the screw 108 to align the projected images of the zeros in the value columns 169 so that as the carriage 124 is moved along the slide rail 104 all of the zeros are at the index line 160 in the "Value" window with no load upon the platter 1.

The condensing lenses 153 and 154 are mounted in brackets 180 (FIG. I) having slotted feet attached to the plate 152 by screws through slots in the feet so that the lenses are adjustable for focus. The condensing lenses 122 and 130 are adjustably mounted for focus by similarly attached brackets 181 (FIG. XII), the bracket for the condensing lens 122 being attached to a leg of the U-shaped bracket 118 and the bracket for the condensing lens 130 being attached to a leg of the U-shaped carriage 124.

The mirror 132 is pivotally mounted on a generally vertical post 182 threaded into the optical frame 94, the post 182 being adjustable up and down and about its axis. The mirror 132 can be pivoted about a generally horizontal axis when a set screw 183 threaded into the top of the post 182 is loosened and the post 182 can be adjusted up and down by turning when a lock nut 184 is loosened. The three adjustments for the mirror 132, i.e., pivoting the mirror on its post, pivoting the post on the optical frame, and the up and down adjustment for the post, permits positioning of the beam 161 from the mirror 132 onto the center of the condensing lens 130. Similarly and for similar reasons, the mirror 121 is pivotally mounted on a generally vertical post 185 threaded into the U-shaped bracket 118. The mirror 121 can be pivoted about a generally horizontal axis when a set screw 186 threaded into the top of the post 185 is loosened and the post 185 can be adjusted up and down by turning when a lock nut 187 is loosened. The three adjustments for the mirror 121, i.e., pivoting the mirror on its post, pivoting the post on the bracket 118, and the up and down adjustment for the post, permits positioning of the beam 155 from the mirror 121 onto the center of the condensing lens 122.

The mirror 123 is held in a holder 188 having a tenon in a hole in the U-shaped bracket 118 which tenon is engaged by a set screw 189. The generally vertical axis of the hole in the bracket is directly in line with the optical axis of the projection lens 120 also mounted on the bracket so that by loosening the set screw 189 and pivoting the holder 188 the beam 155 from the condensing lens 122 may be directed through the chart 32 along the optical axis of the projection lens 120. Similarly, the mirror 131 is held in a holder 190 having a tenon in a hole in the U-shaped carriage 124 which tenon is engaged by a set screw 191. The generally vertical axis of the hole in the carriage is directly in line with the optical axis of the projection lens 129 also mounted on the carriage so that by loosening the set screw 191 and pivoting the holder 190 the beam 161 from the condensing lens 130 may be directed through the chart 32 along the optical axis of the projection lens 129.

The projection lens 120 is held in a V-shaped notch 192 (FIG. V) in the U-shaped bracket 118 and the projection lens 129 is held in a similar notch 193 in the U-shaped carriage 124. Plates 194 hold the lenses 120 and 129 down in the notches 192 and 193, respectively. Each of the lenses 120 and 129 is provided with a groove 195 (FIG. XII) which encircles the usual barrel-like holder for the lens. An eccentric screw 196 has a tenon fitted within the groove and functions as a means for shifting the lens in its V-shaped notch toward or away from the chart 32 for focusing.

The mirror 156 (FIGS. I and XII) is held in a C-shaped bracket 197 having a tenon 198 within a hole in the U-shaped bracket 118. A set screw 199 retains the tenon 198 in the hole. When the set screw 199 is loosened, the mirror 156 can be pivoted about the axis of the tenon 198 to locate the projected images of the weight indicia square with the "Weight" window in front of the display screen 92. The distance between the legs of the C-shaped bracket 197 can be varied by turning a screw 200 which extends through the upper leg (FIG. I) and which is threaded into the lower leg to pivot the mirror 156 about a generally horizontal axis to tip the mirror vertically for zero adjustment of the projected images of the weight indicia in the "Weight" window. Similarly, the mirror 162 (FIGS. XII and XIII) is held in a C-shaped bracket 201 having a tenon 202 within a hole in the carriage 124. A set screw 203 retains the tenon 202 in the hole. When the set screw 203 is loosened, the mirror 162 can be pivoted about the axis of the tenon 202 to locate the projected images of the unit price and/or computed value indicia square with the "Value" window in front of the display screen 92. The distance between the legs of the C-shaped bracket 201 can be varied by turning a screw 204 which extends through the upper leg and which is threaded into the lower leg to pivot the mirror 162 about a generally horizontal axis to tip the mirror vertically for zero adjustment of the projected images of the computed value indicia in the "Value" window.

The scale may be modified by fixedly mounting the optical frame 94 on the base 6 of the scale instead of pivotally mounting it and by substituting the chart assembly which is shown in FIGS. XVI–XVIII for the chart assembly that is shown in FIGS. IX and X. Reference numerals in FIGS. XVI–XVIII which are similar to reference numerals in FIGS. I–XV identify elements which are alike in structure and in function to those illustrated in FIGS. I–XV. The substitution of the chart assembly which is shown in FIGS. XVI–XVIII for the chart assembly that is shown in FIGS. IX and X is necessary because the stationary optical frame in the modified scale does not maintain the physical distance between the chart and the projection lenses approximately constant and means other than the pivotally mounted optical frame must be provided for automatically focusing the optical system to compensate for the arcuate path of the chart.

The means for automatically focusing the optical system to compensate for the arcuate path of the chart includes a positive lens 205 (FIGS. XVI–XVIII) and a negative lens 206 in juxtaposition and movable as one with a chart 32a, the positive lens 205 facing the projection lenses, i.e., the projection lenses are located on the left-hand side of the positive lens as viewed in FIG. XVIII.

The positive lens 205 functions to maintain the optical distance between the chart 32a and the projection lenses constant automatically focusing the optical system when the chart 32a is moved past the projection lenses in its arcuate path, while the negative lens 206 functions to correct or to neutralize the bending of the light beams projecting images of weight, unit price and computed value indicia as they might otherwise leave the positive lens. The positive lens 205 and the chart 32a are so located relative to the projection lenses at one half scale capacity that the optical axes of the lenses are opposite to and in alignment with the centers of the positive lens and of the chart. At such one half scale capacity the light beams pass through the chart and the positive lens 205 along a line that is indicated by the arrow in FIG. XVIII and pass through the projection lenses along their optical axes. However, without the negative lens 206, the positive lens 205 would bend the light beam passing through it whenever the chart 32a is moved by the weighing mechanism out of its one half capacity position so that the beams would impinge at sharp angles upon the edges of the projection lenses instead of passing through the lenses along their optical axes. Such bending of the beams is particularly bad at the zero and full capacity positions of the chart and deleteriously effect the brilliancy and sharpness of the projected images.

To neutralize the bending of the light beams as they would otherwise leave the positive lens, the negative lens 206 puts oppositely directed bends in the light beams in the nature of compensating errors before they reach the positive lens so that the neutralizing bends imparted by the negative lens are canceled by the bends imparted by the positive lens. The combination of the negative and positive lenses maintains light beams which are directed along the optical axes of the projection lenses during all positions of the chart 32a and are means movable with the levers for automatically focusing the optical system to compensate for the arcuate path of the chart.

The chart 32a is held by a pair of clamps 207 on a chart plate 66a, there being a glass cover 68a between the plate and the chart to protect the chart. The back of the chart 32a is covered by the negative lens 206 which is clipped to the chart by clamps 208 that are attached to the plate 66a by screws 209, the chart 32a and the negative lens 206 being located over a large rectangular opening 210 in the plate. The positive lens 205 is clipped onto the chart plate 66a over the opening 210 by clamps 211. The chart 32a, cover 68a, chart plate 66a, negative lens 206 and positive lens 205 make up a modified chart assembly which may be substituted for the chart assembly that is illustrated in FIGS. IX and X by removing the pair of eccentric screws 69 and the four clamp screws 70 from the frame 33 (FIGS. IX and X) and by replacing the latter assembly with the modified assembly. The modified assembly is first adjustably attached during assembly of the scale to the chart frame by the eccentric screws 69 and positioned by means of the screws 69 to locate the chart 32a square with the motion of the scale and then fixedly attached to the chart frame by the clamp screws 70.

The main lever 4 is locked for shipment by means of a lever lock 212 illustrated in FIGS. XIX and XX. The lock 212 includes a lever 213 which is pivotally mounted on a hinge pin 214 that is supported by a block 215 secured to the base 6. A spring 216 urges the lever 213 in a clockwise direction as viewed in FIG. XIX. When a lock cam 217 is positioned as shown and when the main lever 4 is pushed downwardly to its one-half capacity position, a lock pin 218 carried by a block 219 on the main lever 4 is engaged by a notch 220 in the lock lever 213 to hold the main lever for shipment.

The main lever 4 is unlocked by turning a stud 221 that is rotatably mounted on the platform 24, which is supported by posts 222 erected from the base 6, and that carries on its lower end the lock cam 217 until a shoulder 223 (FIG. XX) on the cam engages the upper end of the lock lever 213 and holds the lever 213 away from the lock pin 218 so that the main lever 4 is free to move in an unobstructed path.

The main lever 4 is locked by first turning the stud 221 until the lock cam 217 is positioned as shown in FIG. XIX against a stop pin 224 on the platform 24 and then by pushing down upon the main lever 4 until the notch 220 is spring urged into engagement with the lock pin 218.

The modified scale illustrated in FIGS. XVI–XVIII has, because of the positive lens 205, an inherent plus error at its one-quarter capacity position and an inherent minus error at its three-quarter capacity position. On the other hand, the unmodified scale illustrated in FIGS. I–XV has an inherent minus error at its one-quarter capacity position and an inherent plus error at its three-quarter capacity position. Both of the scales must be corrected at such quarter capacity positions and also must have means for adjusting their sensitivities at their zero, one-half, and full capacity positions.

There are many sources of such errors in weighing scales which may be considered to be caused in general by accidental errors of manufacturing and assembly. That is, each weighing scale comes off of the production line a little different from every other one and must be calibrated in the factory against test weights before shipment to a customer. When plotted as ordinates above and below a straight line divided uniformly according to even divisions of the weighing scale charts, the errors form a harmonic curve. The resilient calibrating means of the invention functions to produce selective equal and harmonic correction effects for the purpose of canceling the inherent scale errors.

The sensitivity of the weighing scale, modified as shown in FIGS. XVI–XVIII, is adjusted by means of the resilient calibrator shown in FIGS. XXI and XXII. It is to be understood, that such calibrator is suitable, not only for adjusting the sensitivity of any projected indication weighing scale, but also for adjusting the sensitivity of any weighing scale, such as a multiple-turn indicator scale. The resilient calibrator is connected to any member which follows a consistent path, i.e., which has a non-sloppy movement, and which delivers forces to the scale. In an ordinary dial scale, use of the improved calibrator lightens the meshing pressure of the usual rack and pinion indicator or chart drive because the conventional unbalancing of the scale indicator or chart for calibrating purposes is eliminated.

Referring to FIGS. XXI–XXII, the resilient calibrator includes a post 225 erected from a foot 226 having slots 227 which cooperate with shoulder screws 228 threaded into the base 6 of the scale, the foot 226 being slidable back and forth on the shoulders of the screws 228 in the direction of the lower one of the double-ended arrows in FIG. XXI when an adjustment screw 229, operatively connected to the foot, is turned. A plate 230 carried on the shoulder of an adjustment screw 231 is mounted on the top of the post 225 and carries a corrector leaf spring 232 suspended from its free end. The plate 230 also carries an adjustment screw 233 the shoulder of which functions to support a bracket 234 and the lower end of which is threaded into a block 235.

Horizontal pins 236 in the block 235 support a pair of straps 237 which are spaced by the block in sandwich form. The right hand ends of the straps 237 embrace the post 225 and are connected together by means of a spacer 238 that serves as an axle for a roller 239 which, when it is turned about the axis of such axle, rolls upon the surface of the post. The left hand ends of the straps 237 are connected together by means of a spacer 240 which provides an abutment for a first coil retainer 241 that compresses a small coil spring 242 between it and a second coil retainer 243 which is urged by the coil spring against a flat side of the corrector leaf spring 232, the corrector leaf spring being pinched between the coil retainer 243 and an end of the block 235.

The free or lower end of the corrector leaf spring 232 is connected to a ribbon 244 that is sandwiched between guards 245 and that is connected to an extension 246 on the chart lever 35 by means of a ribbon 247. Alternatively, the leaf spring 232 may be connected to the main lever 4. As illustrated in FIG. XXI, the scale is in its one-half capacity position wherein the ribbon joints 248, 249, and 250 are in the same plane. The ribbon 244 may pull down on the load counterbalancing spring 7 to which it is operatively connected or it may push up on the load counterbalancing spring 7 when no load is upon the scale depending upon the position of the post 225 relative to the base 6 without affecting the principles upon which the resilient sensitivity adjustments of the invention are based. That is, it is immaterial whether the corrector leaf spring 232 has a push or pull effect on the weighing mechanism. For the purposes of the present explanation, the corrector leaf spring 232 is considered to be in tension to pull down on the load counterbalancing spring 7 at the no load position of the spring 7. It follows that if the corrector leaf spring 232 pulls down on the load counterbalancing spring 7 at zero capacity, the corrector leaf spring 232 pulls up on the load counterbalancing spring 7 at full capacity to affect the span of the scale. Hence, the span of the scale (zero and full capacities) is adjusted by shifting the calibrator by turning the adjustment screw 229 one way or the other to vary the magnitude of the elastically applied force. Shifting of the calibrator to the right increases the force to narrow the span and shifting of the calibrator to the left lessens the force to widen the span.

The equal and opposite effect of the calibrator at zero and full scale capacities puts a quarter capacity error into the scale which is minus at the first quarter and plus at the third quarter to cancel the inherent plus scale error at the first quarter and the inherent minus scale error at the third quarter. Such minus-plus correcting effect of the calibrator is produced by the spring rate (rate of force) of the corrector leaf spring 232 which bends or becomes bowed when the scale is operated. It is to be emphasized that the ribbon 244 must be very thin so that the minus-plus correcting effect of the calibrator is not too great. That is, if the joint 249 at the bottom of the corrector leaf spring 232 comprises a ribbon 244 of heavy material, the minus-plus correcting effect of the calibrator will more than cancel out the inherent plus-minus error of the scale so that the mechanism will be inoperative.

In operation, as hereinbefore described, the span (zero and full capacities) of the scale is adjusted by turning the adjustment screw 229 one way or the other to vary the magnitude of the elastically applied force. Such varying of the force does not change the position of the scale at one-half capacity because the ribbon joints 248, 249, and 250 are in line, as illustrated, at one-half capacity.

The one-half capacity position of the scale is adjusted by changing the elevation of the joint 249 as indicated by the vertical double-ended arrow in FIG. XXI. This changes the line of action of the elastically applied force to set the scale to one-half and is accomplished by turning the adjustment screw 231 one way or the other. The plate 230, carried up or down by the shoulder of the screw 231, carries in turn the corrector leaf spring 232 and the bracket 234 up or down, the straps 237 moving along with the block 235 and the bracket 234 and the roller 239 rolling on the surface of the post 225. That is, turning of the adjustment screw 231 causes the entire calibrating mechanism to move up or down relative to the post 225 as a unit to change the elevation of the lower end of the corrector leaf spring 232.

The one-quarter and three-quarter capacity positions of the scale are adjusted by changing the rate of the corrector leaf spring 232 by changing the effective length of the spring. This is accomplished by turning the adjustment screw 233 which pushes or pulls the block 235 into which it is threaded up or down relative to the spring 232 and relative to the bracket 234, the left hand end of the block 235 sliding on the spring 232 which is resiliently urged toward the block by the small coil spring 242 and the right hand end of the block sliding on the vertical surface of the bracket 234. Since bending of the corrector leaf spring 232, under the influence of movement of the chart lever 35, is from its fulcrum point on the block 235, movement of the block 235 relative to the corrector leaf spring 232 changes the effective length of the spring.

To insure that equal increments of load upon the platter 1 cause uniform or correct indications of the weight of the load upon the display screen 92, test weights of one-quarter, one-half, three-quarter, and full capacities are placed upon the platter 1, and the adjustment screws 229, 231, and 233 are turned by trial and error until the scale is sealed in or straight lined at its zero, one-quarter, one-half, three-quarter, and full capacity positions.

The resilient calibrating means has been described so far as being useful for adjusting the sensitivity of a weighing scale having an inherent plus-minus error at the respective quarters. However, such calibrating means is equally useful for adjusting the sensitivity of a weighing scale having an inherent minus-plus error at the respective quarters. An example of such a scale which happens to have an inherent minus-plus error is shown in FIGS. I–XV. A source of such minus-plus quarters error is in the flexure ribbons 36, 37, and 95. The inherent minus-plus quarters error of such scale first is more than canceled by putting in a plus-minus quarters error (correcting error) by means of a quarters calibrator 251 which is illustrated in detail in FIGS. XXIII and XXIV. The scale then has a resulting plus-minus quarters error similar to the modified scale illustrated in FIGS. XVI–XVIII, which resulting plus-minus quarters error may be canceled by means of the calibrator hereinbefore described and shown in FIGS. XXI and XXII.

The resilient calibrating device 251 which is illustrated in detail in FIGS. XXIII and XXIV is shown attached to the scale in FIGS. V and VI; it includes a leaf spring 252 connected at one end by a screw 253 to the optical frame 94 and bearing at its other end upon a ball bearing 254 which is rotatably mounted on an arm 255. A stationary foot 256, attached at 257 to the base 6, has threaded therethrough an adjustment screw 258 carrying a bracket 259 on a shoulder formed by means of nuts 260 on the screw. Guide pins 261 fixed in the bracket 259 are guided in a groove 262 in the stationary foot 256 when the bracket 259 is moved up or down in the direction of the double-ended arrow in FIG. XXIII as the adjustment screw 258 is turned and thereby threaded into or out of the foot. The arm 255, the bracket 259 and the stationary foot 256 are held together in a friction joint by means of a spring clip 263 so that the bracket and the arm move up or down together as one, relative to the stationary foot.

The lower one of the pins 261 extends through a close fitting hole 264 in the arm 255 and functions as a pivot pin about the axis of which the arm is adjustably pivotable relative to the bracket 259, the friction joint keeping the arm 255 in its adjusted pivoted position. (The lower one of the pins 261 also functions to lift or lower the arm 255 when the bracket 259 is shifted.) The limits of the pivotable path of the arm 255 are determined by the size of a hole 265 through which the upper one of the pins 261 extends in a sloppy fit. Hence, the arm 255 can be moved in the directions indicated by the double-ended arrow in FIG. XXIII along with the bracket 259 by turning the adjustment screw 258 or the arm 255 can be pivoted as indicated by the double-ended arrow in FIG. XXIV relative to the bracket 259, by grasping the upper end of the arm with a tool and moving it in the friction joint provided by the spring clip 263.

The sensitivity of the scale at its one-quarter and three-quarter positions is adjusted by raising or lowering the ball bearing 254 to vary the force applied to the leaf spring 252 and, thus, to vary the force elastically applied to the optical frame 94 operatively connected to the weighing mechanism through the optical frame drive link 175.

It should be noted that the force on the leaf spring 252 is varied to adjust the quarter positions and not the rate of the spring (like the rate of the corrector leaf spring 232 is varied); this may be done because the scale has three points of "neutrality," i.e., it is "neutral" at zero, one-half, and full capacities, the term "neutral" being hereinafter defined.

The scale is "neutral" at one-half capacity because the pivot points for the optical frame drive link 175, i.e., the ball bearings 176 and the link's flexure ribbon 173, and the pivot points at the flexure end of the chart lever 35, i.e., the fulcrum ribbons 37, are in line or in the same plane. Attempts to move the optical frame 94 at the one-half capacity position by finger pressure fail. Therefore, forces applied to the optical frame 94 by the quarters calibrator 251 has no effect on the scale when the scale is at its one-half capacity "neutral" position.

The scale also is "neutral" at zero and full capacities because the three ribbon supports 95 for the optical frame 94 and the direction of the force on the optical frame 94 provided by the quarters calibrator 251 are parallel. Hence, at the zero and full capacity positions, the quarters calibrator 251 imparts no lengthwise (horizontal) force component to the weighing mechanism. This is insured, before a quarters adjustment is made, by pivoting the arm 255 carrying the ball bearing 254 relative to the leaf spring 252 to a position such that, when no load is upon the platter 1, vertical movement of the ball bearing 254 produced by turning the adjustment screw 258 has no effect on the weight indication displayed on the screen 92. Therefore, forces applied to the optical frame 94 by the quarters calibrator 251 has no effect on the scale when the scale is at its zero and full capacity "neutral" positions. At such zero and full capacity positions, the end of the leaf spring 252 rests on the top of the ball bearing 254 as shown in FIG. XXIV, and at the one-half capacity position the end of the leaf spring 252 is at its maximum position from such top location on the ball bearing.

The resulting plus-minus quarters error, which is left after the quarters calibrator 251 puts a plus-minus quarters correcting error into the scale which is greater than the original inherent minus-plus quarters error in the scale, can be cancelled by means of the resilient calibrator hereinbefore described in connection with FIGS. XXI and XXII or by a modified resilient calibrating means shown in FIGS. XXV and XXVI that puts a minus-plus quarters error into the scale.

The calibrating means illustrated in FIGS. XXV and XXVI is used to adjust the zero, one-half, and full capacity positions of the scale in the same way that the device illustrated in FIGS. XXI and XXII is used, the difference between the devices being that whereas the device illustrated in FIGS. XXI and XXII is constructed in a unit assembly, the calibrating means illustrated in FIGS. XXV and XXVI is divided into several parts—however, the operating principles are the same.

The calibrator 266 illustrated fragmentarily in FIG. XXV is shown attached to the scale in FIGS. V and VI and functions to adjust the span (zero and full capacity positions) of the scale; it is divided into two sections, one for making an initial rough adjustment and the other for making a final fine adjustment.

The rough or approximate adjustment section (FIG. VI) includes a stationary mounting plate 267, attached to the base 6 by screws 268, having a longitudinally extending slot 269 within which is slidable a span coil adjusting bracket 270. The bracket 270 is guided in the slot 269 by means of a pin 271 and a shoulder screw 272 carried by the bracket, the shoulder screw functioning additionally, when it is tightened, to hold the bracket in its adjusted position on the mounting plate. A calibrating span coil 273 extends between a tip 274 of the slidable bracket 270 and a fine adjustment section 275 of the calibrator.

The fine adjustment section 275 of the calibrator 266 (see also FIG. XXV) includes a span coil anchor bracket 276 fixedly attached at its one end by screws 277, one of which is shown in FIG. VI, to the optical frame 94 and carrying a bell crank 278 on its other end, the bell crank 278 being attached to the bracket 276 at pivot 279 and the other end of the calibrating span coil 273 being attached to the bell crank 278. An ear 280 on the coil anchor bracket 276 has threaded therethrough an adjustment screw 281 which extends through a clearance hole in an ear 282 on the bell crank 278. The tension in the calibrating span coil 273 attached to the bell crank 278 is varied by turning the adjustment screw 281; this threads the screw out of or into the ear 280. Upward movement of the head of the adjustment screw 281 lifts up on the ear 282 on the bell crank 278 in opposition to the span coil 273. Downward movement of the head of the adjustment screw 281 permits the bell crank 278 to be pivoted at 279 in a counterclockwise direction as viewed in FIG. XXV by the span coil 273.

The zero and full capacity positions of the scale (span) are approximately adjusted by loosening the shoulder screw 272 and sliding the span coil adjustment bracket 270 back and forth to vary the magnitude of the force which is elastically applied to the scale through the span coil 273 attached to the slidable bracket 270 and operatively connected to the optical frame 94 and, hence, operatively connected to the weighing mechanism (the optical frame 94 is connected through its drive link 175 to the weighing lever system). Such varying of the magnitude of the elastically applied force and, hence, varying of the sensitivity of the scale is directly comparable to the varying of the magnitude of the elastically applied force by shifting the corrector leaf spring 232 (FIG. XXI) back and forth by turning the adjustment screw 229, the span adjustment device shown in FIGS. VI and XXV being merely a modification of the one shown in FIG. XXI.

After the zero and full capacity positions of the scale are approximately adjusted, a fine adjustment is made by turning the adjustment screw 281 to pivot the bell crank 278 varying the tension in the span coil 273.

The calibrator 233 illustrated in FIG. XXVI is shown attached to the scale in FIGS. V and VI and functions to adjust the one-half capacity position of the scale; it includes a stationary foot 284, fixed at 285 to the base 6 of the scale, upon which is mounted a pair of vertical guide pins 286 and through which is threaded an adjustment screw 287. A shoulder formed by nuts 288 on the screw 287 carries a leaf mount 289 which is guided in a vertical path by the pins 286 that extend through holes in the leaf mount 289. A small coil spring 290 compressed between the foot 284 and nuts 291 on the bottom of the screw 287 takes play out of the system. Threading of the screw 287 into or out of the stationary foot 284 moves the leaf mount 289 downwardly or upwardly, respectively.

A bi-metallic leaf 292 is fixed to the lower end of the vertically positionable leaf mount 289 and is connected at its upper end to a wire 293 which is attached by means of a coil anchor 294 to the chart lever 35 and, hence, to the weighing mechanism. The wire 293 applies an elastic tension force to the weighing mechanism the line of action of which is varied by turning the adjustment screw 287 varying the elevation of the end of the wire 293 at the leaf 292 to set the scale to one-half. Such varying of the line of action of the elastically applied force is directly comparable to the varying of the line of action of the elastically applied force by moving the corrector leaf spring 232 (FIG. XXI) up or down by turning the adjustment screw 231, the one-half capacity adjustment device shown in FIG. XXVI being merely a modification of the one shown in FIG. XXI.

The sensitivity of the scale has an appreciable change with change in temperature. Therefore, the magnitude of the force applied by the wire 293 is varied according to temperature by temperature stresses set up in the bimetal strip 292. The use of a bimetal strip permits simple automatic correction of the temperature error.

In operation, the scale is sealed in or straight lined at its zero, one-quarter, one-half, three-quarter, and full capacity positions by the following sensitivity adjustment procedure:

(1) (*a*) Pivot the arm 255 of the quarters calibrator 251 carrying the ball bearing 254 relative to the leaf spring 253 as indicated by the double ended arrow in FIG. XXIV to a position such that, when no load is upon the platter 1, vertical movement of the ball bearing 254 as indicated by the double ended arrow in FIG. XXIII has no effect on the weight indication displayed on the screen 92;

(*b*) Set the ball bearing 254 to its approximate vertical position learned through trial and error experience;

(2) Adjust the span of the scale by turning first the approximate adjustment shoulder screw 272 of the span calibrator 266 and sliding the span coil adjustment bracket 270 back or forth and then, after re-tightening the shoulder screw 272, the final adjustment screw 281 of the span calibrator 266 until zero indication is displayed on the screen 92. When no load is upon the platter 1 and full indication, e.g., 15 pounds, is displayed on the screen 92 when a full capacity test weight is upon the platter (zero adjustment made by holding the tare knob 88 stationary and turning the screw 90—FIG. VII—as hereinbefore described can be made at any time necesary);

(3) Adjust the one-half capacity position of the scale by turning the adjustment screw 287 of the one-half capacity adjustment calibrator 283 until one-half indication, e.g., 7½ pounds in a 15 pounds capacity scale is displayed on the screen 92 when a one-half capacity test weight is upon the platter 1;

(4) Check the span of the scale—in some instances a slight readjustment is required;

(5) Check the one-half capacity position of the scale—this is usually perfect at this point; and (6) Set the ball bearings 254 of the quarters calibrator 251 to a vertical position such that one-quarter indication, e.g., 3¾ pounds in a 15 pounds capacity scale, is displayed on the screen 92 when a one-quarter capacity test weight is upon the platter 1—this automatically sets the correct three-quarter capacity position; the scale now displays on the screen 92 an accurate projected indication of the weight of any load that is placed upon the platter 1 and that is within the capacity of the scale.

It will, of course, be understood that various details of construction may be varied over a wide range without departing from the principles of the resilient calibrating means of this invention, and it is therefore not the purpose to limit the patent granted hereon otherwise than necessitated by the scope of the appended claims.

Having described the invention. I claim:

1. A projected weighing scale comprising, in combination, weighing mechanism, an indicia-bearing chart movable in an arcuate path with the weighing mechanism, a screen, an optical system including a projection lens for projecting images of the chart indicia onto the screen, means carrying the projection lens movable with the weighing mechanism for maintaining an approximately constant distance between the chart and the projection lens to keep the optical system in focus, a leaf spring connected to said means applying force opposing movement of said means, and adjustment means operatively connected to the spring for varying the magnitude of said force to adjust the sensitivity of the scale at its one-quarter and three-quarter capacity positions.

2. A projected indication weighing scale according to claim 1 wherein the adjustment means includes a freely rotatable member upon which the leaf spring bears.

3. A projected indication weighing scale according to claim 1 wherein the adjustment means includes a stationarily mounted foot, an arm, adjustable means mounting the arm on the foot for movements in arcuate and linear paths, and a bearing on the arm, an end of the leaf spring resting upon the bearing, selective movement of the arm in its arcuate path aligning the bearing with the end of the leaf spring resting thereupon and selective movement of the arm in its linear path varying force applied by the bearing to the leaf spring and thus varying the force applied by the leaf spring to said means movable with the weighing mechanism.

References Cited in the file of this patent

UNITED STATES PATENTS

| | | |
|---|---|---|
| 1,177,194 | McFarlane | Mar. 28, 1916 |
| 1,856,411 | Carroll | May 3, 1932 |
| 2,098,846 | Weber et al. | Nov. 9, 1937 |
| 2,244,621 | Hurt | June 3, 1941 |
| 2,333,703 | Conners | Nov. 9, 1943 |
| 2,405,619 | Sutton | Aug. 13, 1946 |
| 2,592,795 | Dillon | Apr. 15, 1952 |
| 2,723,113 | Meeker et al. | Nov. 8, 1955 |
| 2,849,223 | Rikken | Aug. 26, 1958 |